United States Patent
Ramakrishna et al.

(10) Patent No.: US 10,761,810 B2
(45) Date of Patent: Sep. 1, 2020

(54) AUTOMATING TESTING AND DEPLOYMENT OF SOFTWARE CODE CHANGES

(71) Applicant: Accenture Global Solutions Limited, Dublin (IE)

(72) Inventors: Chitkala Ramakrishna, Bangalore (IN); Jayanthi Mohanram, Bangalore (IN); Satish Renugopal, Bangalore (IN); Jyoti Derawal, Bangalore (IN); Shetty Dhiraj, Bangalore (IN); Peter Perbellini, Brisbane (AU); Nair Arjun, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/171,083

(22) Filed: Oct. 25, 2018

(65) Prior Publication Data
US 2020/0019493 A1 Jan. 16, 2020

(30) Foreign Application Priority Data
Jun. 27, 2018 (IN) .............................. 201841023969

(51) Int. Cl.
*G06F 9/44* (2018.01)
*G06F 8/20* (2018.01)
(Continued)

(52) U.S. Cl.
CPC .................. *G06F 8/20* (2013.01); *G06F 8/30* (2013.01); *G06F 8/61* (2013.01); *G06F 8/65* (2013.01);
(Continued)

(58) Field of Classification Search
CPC .......... G06F 8/71; G06F 8/20; G06F 11/3688; G06F 11/3476; G06F 11/368;
(Continued)

(56) References Cited

U.S. PATENT DOCUMENTS 8,276,123 B1 * 9/2012 Deng ................... G06F 11/3688
714/37
10,585,656 B1 * 3/2020 Das ..................... G06F 11/3476
(Continued)

*Primary Examiner* — Tuan A Vu
(74) *Attorney, Agent, or Firm* — Harrity & Harrity, LLP

(57) ABSTRACT

A device creates tasks to implement a software code change in a software code and to generate new software code, and performs, via a development environment, a unit test on the new software code to generate a unit test result. The device performs, via the development environment, a functional test on the new software code to generate a functional test result, and updates, based on the unit test result and the functional test result, the new software code to generate updated new software code. The device performs, via a quality assurance environment, a regression test on the updated new software code to generate a regression test result, and updates, based on the regression test result, the updated new software code to generate final software code. The device automatically deploys the final software code in a production environment, and performs actions based on deploying the final software code.

20 Claims, 15 Drawing Sheets

(51) Int. Cl.
*G06F 11/36* (2006.01)
*G06F 8/30* (2018.01)
*G06F 8/65* (2018.01)
*G06F 8/61* (2018.01)

(52) U.S. Cl.
CPC ...... *G06F 11/3664* (2013.01); *G06F 11/3684* (2013.01); *G06F 11/3688* (2013.01); *G06F 11/3692* (2013.01); *G06F 11/368* (2013.01)

(58) Field of Classification Search
CPC . G06F 11/3684; G06F 11/3692; G06Q 10/10; G06Q 10/06311
See application file for complete search history.

(56) References Cited

U.S. PATENT DOCUMENTS

| | | | |
|---|---|---|---|
| 2003/0009740 A1* | 1/2003 | Lan | G06F 8/20 717/102 |
| 2004/0143811 A1* | 7/2004 | Kaelicke | G06F 8/20 717/101 |
| 2006/0059253 A1* | 3/2006 | Goodman | G06Q 10/10 709/223 |
| 2007/0185929 A1* | 8/2007 | Azoulay | G06F 8/71 |
| 2016/0162478 A1* | 6/2016 | Blassin | G06Q 10/06311 |

* cited by examiner

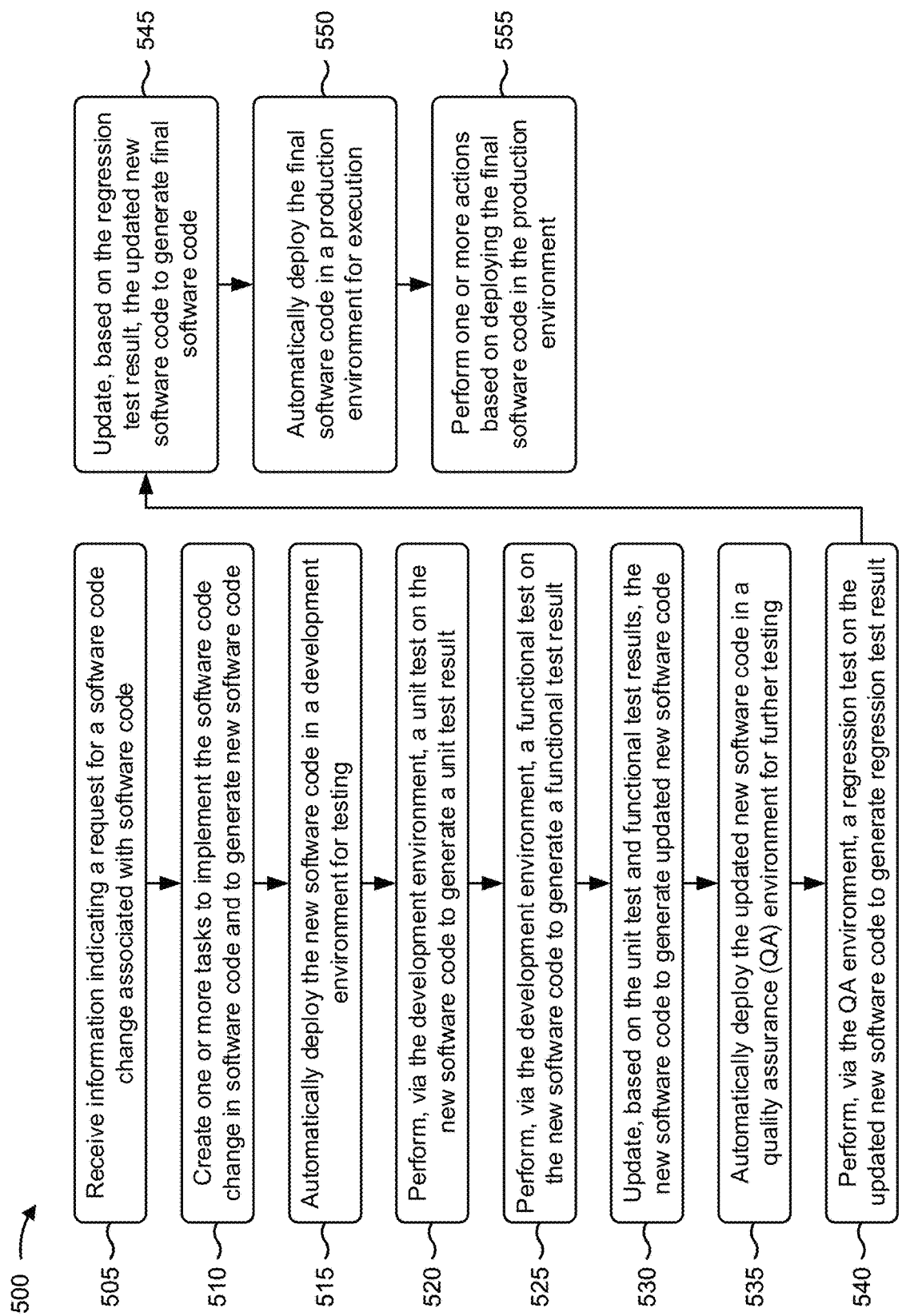

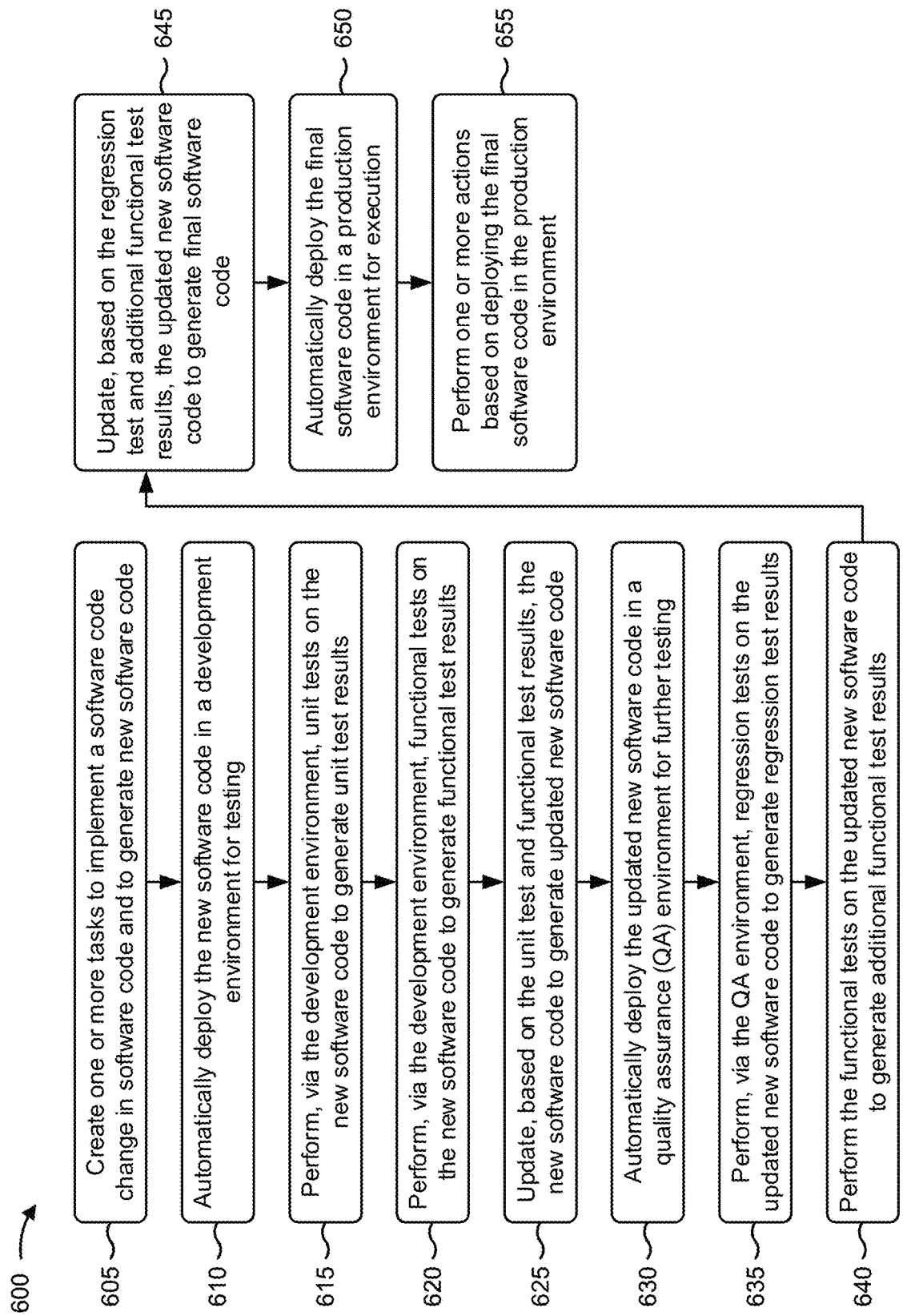

AUTOMATING TESTING AND DEPLOYMENT OF SOFTWARE CODE CHANGES

RELATED APPLICATION

This application claims priority under 35 U.S.C. § 119 to Indian Patent Application No. 201841023969, filed on Jun. 27, 2018, the content of which is incorporated by reference herein in its entirety.

BACKGROUND

Software change request management systems manage processes performed during a software code change from design of the software code change, to testing of the software code change, and to deployment of the software code change in a production environment. Typical software change request management systems do not include features to maintain stepwise execution of the processes and to trigger such processes automatically. For example, processes, such as static software code review, peer reviews, testing, dependency checks, deployments, and/or the like, are manually handled by different individuals and executed independently. Furthermore, email communication is typically the only way through which different teams and/or individuals update each other in order to trigger a next set of actions for the process.

SUMMARY

According to some implementations, a method may include receiving information indicating a request for a software code change associated with software code, and creating one or more tasks to implement the software code change in the software code and to generate new software code. The method may include selecting a unit test from a plurality of unit tests, where the unit test is to be performed on the new software code, and performing, via a development environment, the unit test on the new software code to generate a unit test result. The method may include selecting a functional test from a plurality of functional tests, where the functional test is to be performed on the new software code, and performing, via the development environment, the functional test on the new software code to generate a functional test result. The method may include updating, based on the unit test result and the functional test result, the new software code to generate updated new software code, and automatically deploying the updated new software code in a quality assurance environment. The method may include selecting a regression test from a plurality of regression tests, where the regression test is to be performed on the updated new software code, and performing, via the quality assurance environment, the regression test on the updated new software code to generate a regression test result. The method may include updating, based on the regression test result, the updated new software code to generate final software code, and automatically deploying the final software code in a production environment for execution. The method may include performing one or more actions based on deploying the final software code in the production environment.

According to some implementations, a device may include one or more memories, and one or more processors, communicatively coupled to the one or more memories, to receive information indicating a request for a software code change associated with software code, and create one or more tasks to implement the software code change in the software code and to generate new software code. The one or more processors may automatically deploy the new software code in a development environment for testing, and may perform, via the development environment, a unit test on the new software code to generate a unit test result. The one or more processors may perform, via the development environment, a functional test on the new software code to generate a functional test result, and may update, based on the unit test result and the functional test result, the new software code to generate updated new software code. The one or more processors may automatically deploy the updated new software code in a quality assurance environment for further testing, and may perform, via the quality assurance environment, a regression test on the updated new software code to generate a regression test result. The one or more processors may update, based on the regression test result, the updated new software code to generate final software code, and may automatically deploy the final software code in a production environment for execution. The one or more processors may perform one or more actions based on deploying the final software code in the production environment.

According to some implementations, a non-transitory computer-readable medium may store instructions that include one or more instructions that, when executed by one or more processors of a device, cause the one or more processors to create one or more tasks to support implement a software code change in software code and to generate new software code, and automatically deploy the new software code in a development environment for testing. The one or more instructions may cause the one or more processors to perform, via the development environment, unit tests on the new software code to generate unit test results, and perform, via the development environment, functional tests on the new software code to generate functional test results. The one or more instructions may cause the one or more processors to update, based on the unit test results and the functional test results, the new software code to generate updated new software code, and automatically deploy the updated new software code in a quality assurance environment for further testing. The one or more instructions may cause the one or more processors to perform, via the quality assurance environment, regression tests on the updated new software code to generate regression test results, and perform, via the quality assurance environment, the functional tests on the updated new software code to generate additional functional test results. The one or more instructions may cause the one or more processors to update, based on the regression test results and the additional functional test results, the updated new software code to generate final software code, and automatically deploy the final software code in a production environment for execution. The one or more instructions may cause the one or more processors to perform one or more actions based on deploying the final software code in the production environment.

BRIEF DESCRIPTION OF THE DRAWINGS

FIGS. 4-6 are flow charts of example processes for automating testing and deployment of software code changes.

DETAILED DESCRIPTION

Figure 1A:
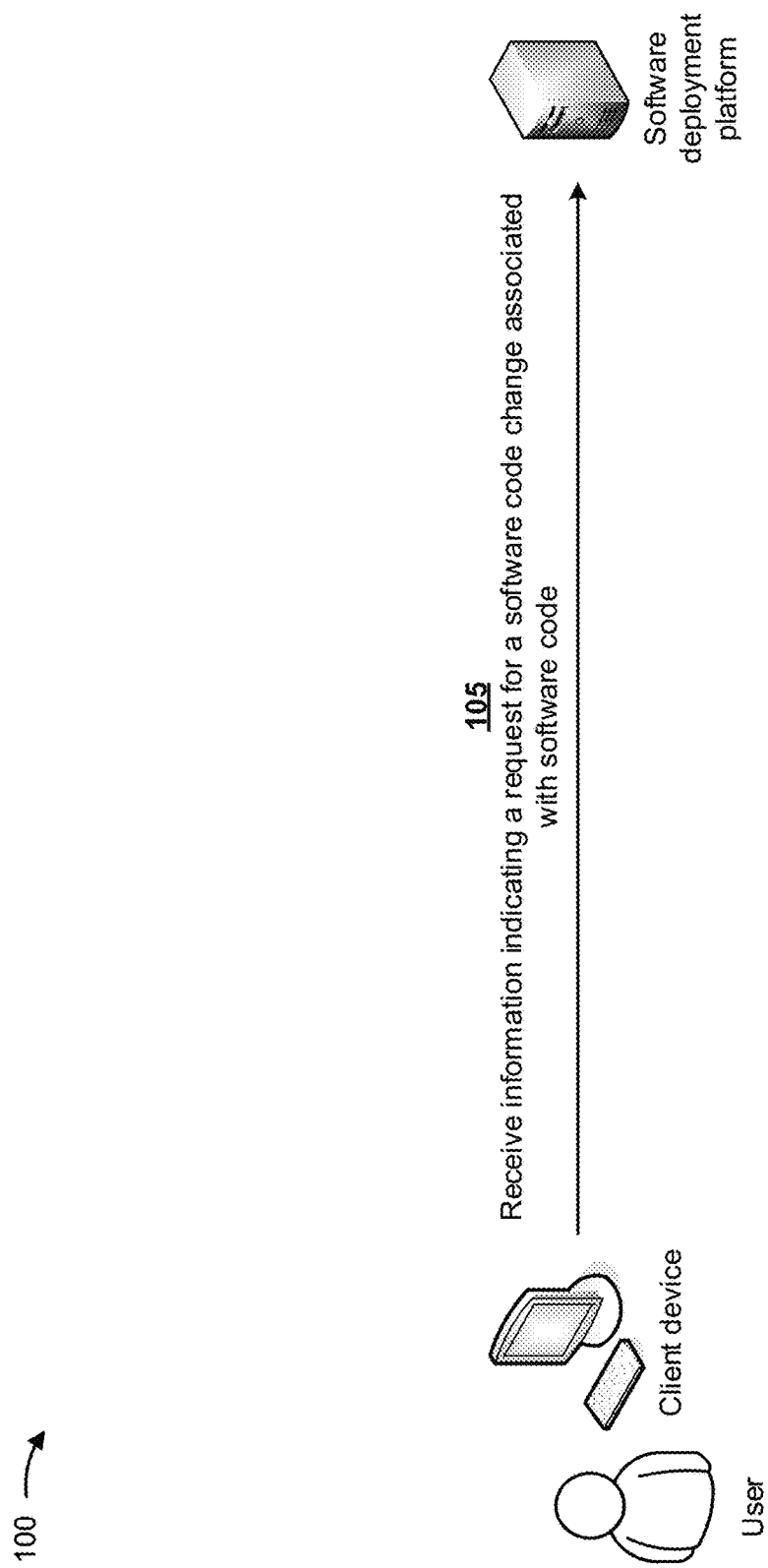
FIGS. 1A-1J are diagrams of an example implementation described herein.

The following detailed description of example implementations refers to the accompanying drawings. The same reference numbers in different drawings may identify the same or similar elements.

Typical software change request management systems do not provide a single view that can be used to track status of development, testing, and deployment of a software code change, and do not automatically identify and execute the test scripts for the software code change. Typical software change request management systems do not automatically link test defects to a request for a software code change (e.g., a requirements document), and require manual closure of test defects when test scripts are successfully executed. Typical software change request management systems also require manual verification of process steps, such as software code review, testing, dependency checking, and/or the like before the software code change may be deployed.

Some implementations described herein provide a software deployment platform that automates testing and deployment of software code changes. For example, the software deployment platform may receive information indicating a request for a software code change associated with software code, and may create one or more tasks to implement the software code change in the software code and to generate new software code. The software deployment platform may automatically deploy the new software code in a development environment for testing, and may perform, via the development environment, a unit test on the new software code to generate a unit test result. The software deployment platform may perform, via the development environment, a functional test on the new software code to generate a functional test result, and may update, based on the unit test result and the functional test result, the new software code to generate updated new software code. The software deployment platform may automatically deploy the updated new software code in a quality assurance environment for further testing, and may perform, via the quality assurance environment, a regression test on the updated new software code to generate a regression test result. The software deployment platform may update, based on the regression test result, the updated new software code to generate final software code, and may automatically deploy the final software code in a production environment for execution. The software deployment platform may perform one or more actions based on deploying the final software code in the production environment.

In this way, the software deployment platform may improve the quality of software code changes and may reduce defect rates in software code changes. The software deployment platform may reduce test execution time and may provide a consolidated view for tracking software development status from requirement creation to deployment in a production environment. The software deployment platform may provide application programming interfaces (APIs) that automate creation of unique identifiers (SAP Charm documents, SAP transport requests, and/or the like) for software code change requests to support in testing and deployment, code reviews, peer reviews, dependency checks, test execution, deployment, and/or the like. The software deployment platform may increase software code quality since software code portions undergo static reviews, peer reviews, and/or the like.

FIGS. 1A-1J are diagrams of an example implementation 100 described herein. As shown in FIGS. 1A-1J, a client device may be associated with a user and a software deployment platform. As further shown in FIG. 1A, and by reference number 105, the software deployment platform may receive, from the client device, information indicating a request for a software code change associated with software code. In some implementations, the information indicating the request for the software code change may include information identifying one or more changes to the software code, new features to include in the software code, features to remove from the software code, and/or the like. In some implementations, the information indicating the request for the software code change may include a technical design document that specifies software code changes in the software code.

In some implementations, the software code may include software code that requires design of a software code change, testing of the software code change, and deployment of the software code change in a production environment. In some implementations, the software code may include software code associated with enterprise resource planning (e.g., software code that manages business operations across procurement, manufacturing, service, sales, finance, human resources, and/or the like), a web application, a mobile application, e-commerce, managing multiple aspects of a business from sales and customer relationships to financials and operations, business intelligence, and/or the like.

Figure 1B:
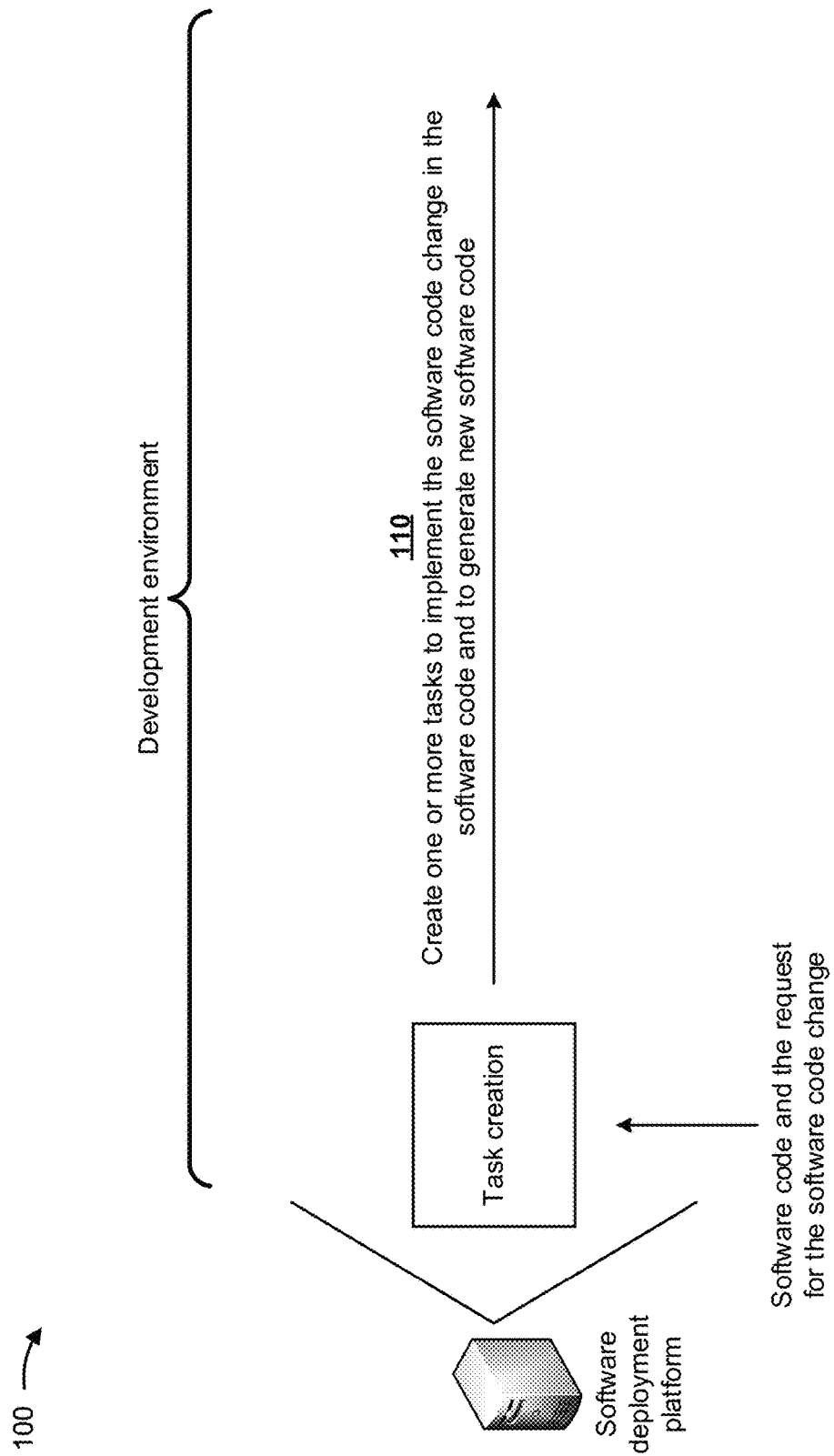

As shown in FIG. 1B, and by reference number 110, the software deployment platform may support with one or more tasks to implement the software code change in the software code and to generate new software code. In some implementations, the software deployment platform may include (or be associated with) a development environment, and may create the one or more tasks via the development environment. In some implementations, the development environment may provide comprehensive facilities for software development, and may include a source code editor, build automation tools, a debugger, an intelligent code completion component, a compiler, an interpreter, a class browser, an object browser, a class hierarchy diagram, and/or the like.

In some implementations, the one or more tasks may include one or more changes to make to the software code, one or more new features to include in the software code, one or more features to remove from the software code, and/or the like. For example, if the software code relates to generation of a sales report (e.g., that includes units sold, selling price, and total sales), the one or more tasks may include one or more changes to be implemented in the sales report (e.g., adding in costs of the sold units, marketing costs, net sales, and/or the like to the sales report). In some implementations, the one or more tasks for the software code change may generate new software code. For example, the one or more tasks may create new software code that implements the one or more changes in the generated sales report.

In some implementations, the software deployment platform may process the software code and the software code change, with a model (e.g., a machine learning model), to determine the one or more tasks to implement the software code change. In some implementations, the software deployment platform may utilize more than one machine learning model to determine the one or more tasks to implement the software code change.

In some implementations, the software deployment platform may perform a training operation on the machine learning model with historical software code change information (e.g., historical information indicating tasks generated for software code changes). For example, the software deployment platform may separate the historical software code change information into a training set, a validation set, a test set, and/or the like. In some implementations, the software deployment platform may train the machine learning model using, for example, an unsupervised training procedure and based on the training set of the historical software code change information. For example, the software deployment platform may perform dimensionality reduction to reduce the historical software code change information to a minimum feature set, thereby reducing resources (e.g., processing resources, memory resources, and/or the like) to train the machine learning model, and may apply a classification technique, to the minimum feature set.

In some implementations, the software deployment platform may use a logistic regression classification technique to determine a categorical outcome (e.g., that the historical software code change information indicates that particular tasks are recommended for particular software code changes). Additionally, or alternatively, the software deployment platform may use a naïve Bayesian classifier technique. In this case, the software deployment platform may perform binary recursive partitioning to split the historical software code change information into partitions and/or branches, and use the partitions and/or branches to perform predictions (e.g., that the historical software code change information indicates that particular tasks are recommended for particular software code changes). Based on using recursive partitioning, the software deployment platform may reduce utilization of computing resources relative to manual, linear sorting and analysis of data points, thereby enabling use of thousands, millions, or billions of data points to train the machine learning model, which may result in a more accurate model than using fewer data points.

Additionally, or alternatively, the software deployment platform may use a support vector machine (SVM) classifier technique to generate a non-linear boundary between data points in the training set. In this case, the non-linear boundary is used to classify test data into a particular class.

Additionally, or alternatively, the software deployment platform may train the machine learning model using a supervised training procedure that includes receiving input to the machine learning model from a subject matter expert, which may reduce an amount of time, an amount of processing resources, and/or the like to train the machine learning model of activity automatability relative to an unsupervised training procedure. In some implementations, the software deployment platform may use one or more other model training techniques, such as a neural network technique, a latent semantic indexing technique, and/or the like. For example, the software deployment platform may perform an artificial neural network processing technique (e.g., using a two-layer feedforward neural network architecture, a three-layer feedforward neural network architecture, and/or the like) to perform pattern recognition with regard to particular tasks indicated in the historical software code change information. In this case, using the artificial neural network processing technique may improve an accuracy of the trained machine learning model generated by the software deployment platform by being more robust to noisy, imprecise, or incomplete data, and by enabling the software deployment platform to detect patterns and/or trends undetectable to human analysts or systems using less complex techniques.

Figure 1C:
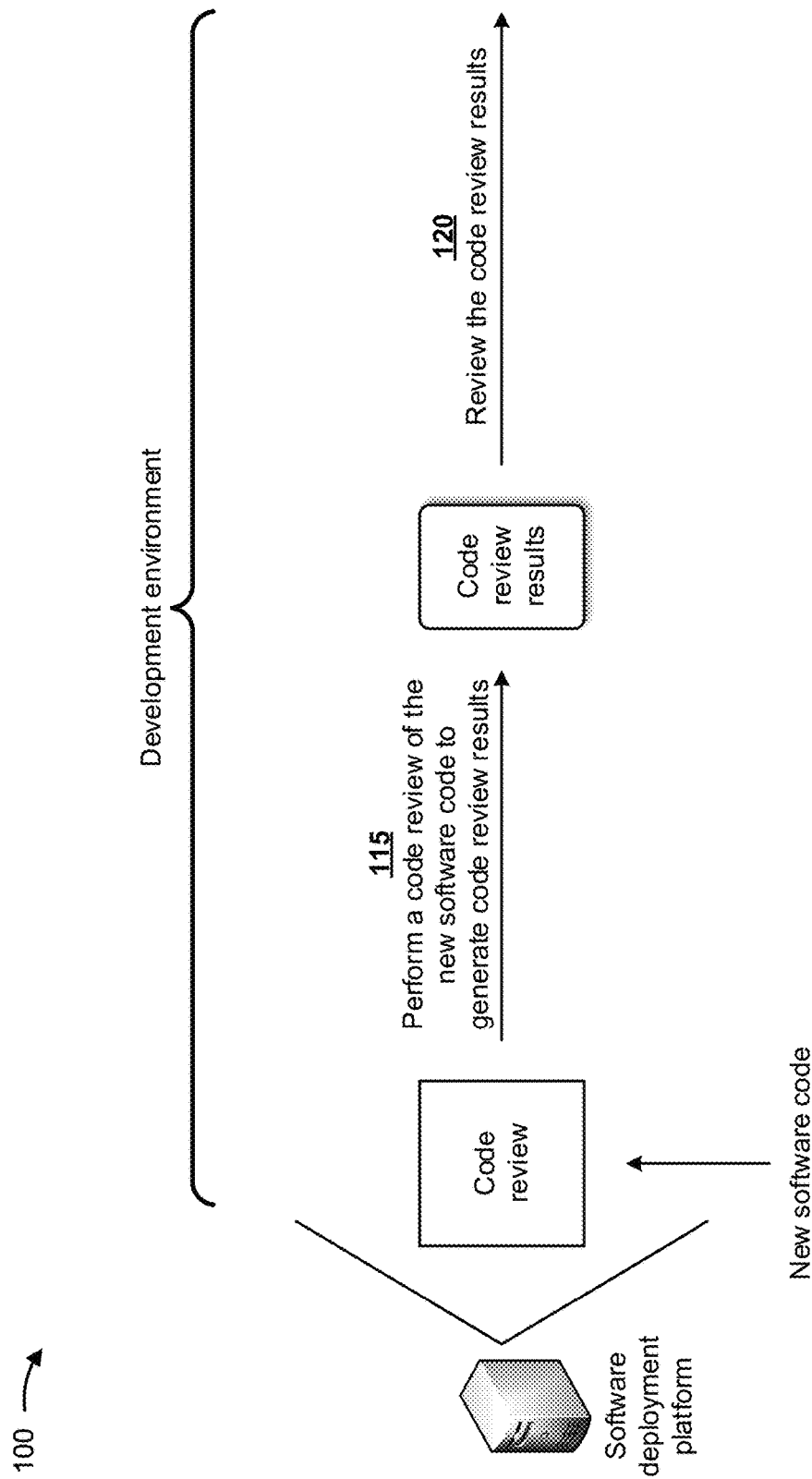

As shown in FIG. 1C, and by reference number 115, the software deployment platform may perform a code review of the new software code (e.g., the software code with the one or more tasks) to generate code review results. In some implementations, the software deployment platform may perform the code review of the new software code via the development environment. In some implementations, the code review may include reviewing the new software code to determine whether the new software code includes any quality issues. For example, the code review may include reviewing the new software code for utilization of best practices, to detect errors in the new software code, to determine vulnerability exposure associated with the new software code, to discover malware associated with the new software code, and/or the like.

As further shown in FIG. 1C, and by reference number 120, the software deployment platform may review the code review results. In some implementations, the software deployment platform may review the code review results via the development environment. In some implementations, the software deployment platform may modify the new software code based on the code review results by making one or more changes to the new software code, by adding one or more new features to the new software code, by removing one or more features from the new software code, and/or the like. In some implementations, the code review may enable the software deployment platform to improve a quality and a maintainability (e.g., a readability, uniformity, understandability, and/or the like) of the new software code, to identify defects in the new software code, to comply with quality assurance guidelines, and/or the like.

Figure 1D:
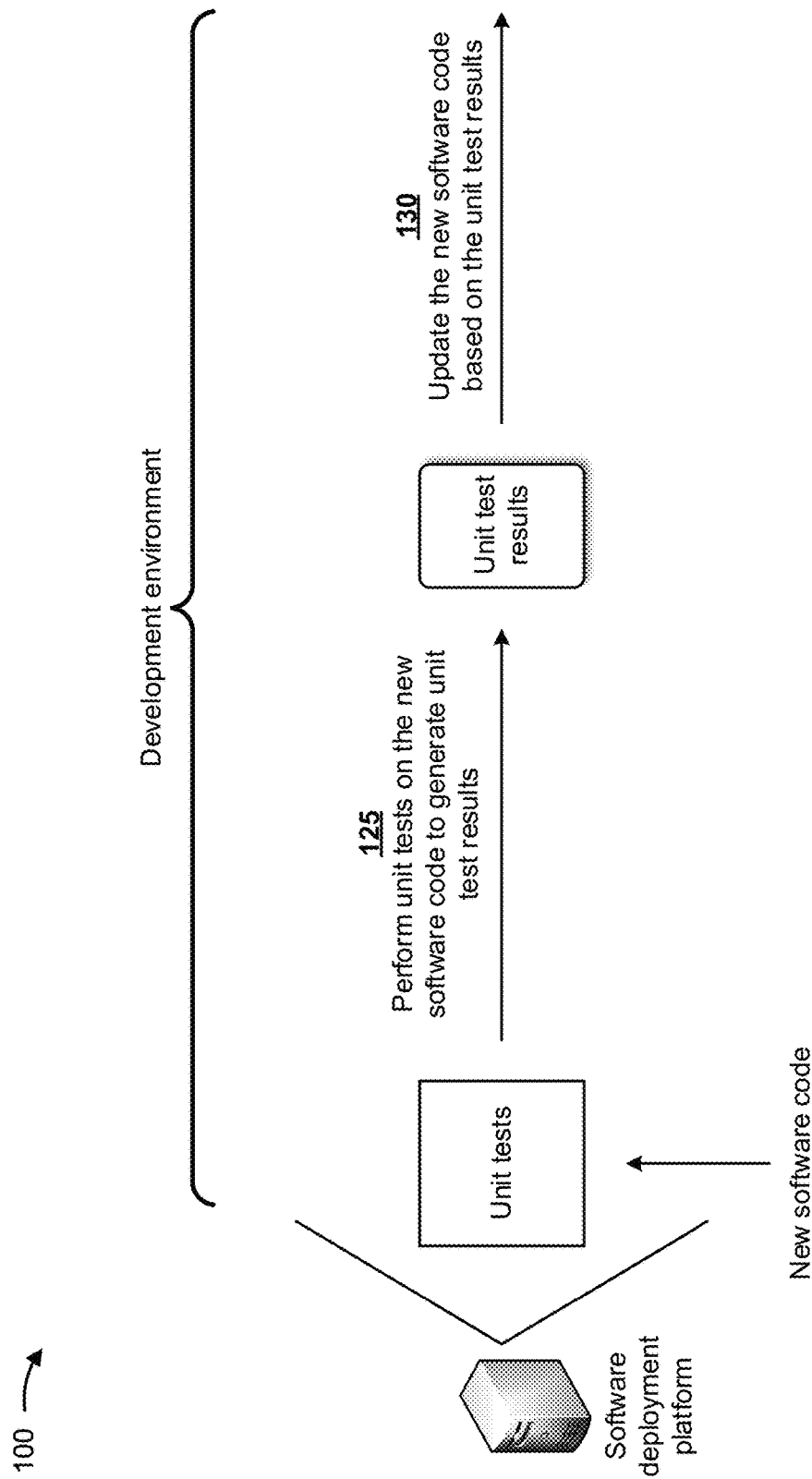

As shown in FIG. 1D, and by reference number 125, the software deployment platform may perform one or more unit tests on the new software code to generate unit test results. In some implementations, the software deployment platform may automate one or more unit tests on the new software code via the development environment. In some implementations, the one or more unit tests may include a workflow test (e.g., to determine whether the new software code is providing a desired functionality and/or process execution), an application lifecycle management test (e.g., that tests a functionality of the new software code, tests performance of the new software code, tests for defects in the new software code, and/or the like), a test management tool test (e.g., a test to create and maintain test artifacts specific for the new software code, a test to establish traceability and coverage of the new software code, a test to collect metrics and/or generate reports for the new software code, a test to track bugs and/or manage defects in the new software code, and/or the like), and/or the like.

In some implementations, the software deployment platform may select the one or more unit tests, from multiple unit tests, based on the new software code. For example, the software deployment platform may analyze the new software code to determine testable units (e.g., components that include one or more inputs and a single output) of the new software code, and may select a unit test that is applicable to the determined testable units of the new software code. In some implementations, the software deployment platform may select the one or more unit tests based on a language of the new software code, based on quantities of inputs in the determined testable units of the new software code, based on behavior of the new software code, and/or the like.

As further shown in FIG. 1D, and by reference number 130, the software deployment platform may update the new software code based on the unit test results. In some implementations, the software deployment platform may update the new software code based on the unit test results via the development environment. In some implementations, the software deployment platform may update the new software code based on the unit test results by making one or more changes to the new software code based on the unit test results, by adding one or more new features to the new software code based on the unit test results, by removing one or more features from the new software code based on the unit test results, and/or the like. In this way, the software deployment platform may enable identification of defects in the new software code, may decrease development time associated with the new software code (e.g., which may conserve resources), may reduce costs associated with correcting defects in the new software code, and/or the like.

Figure 1E:
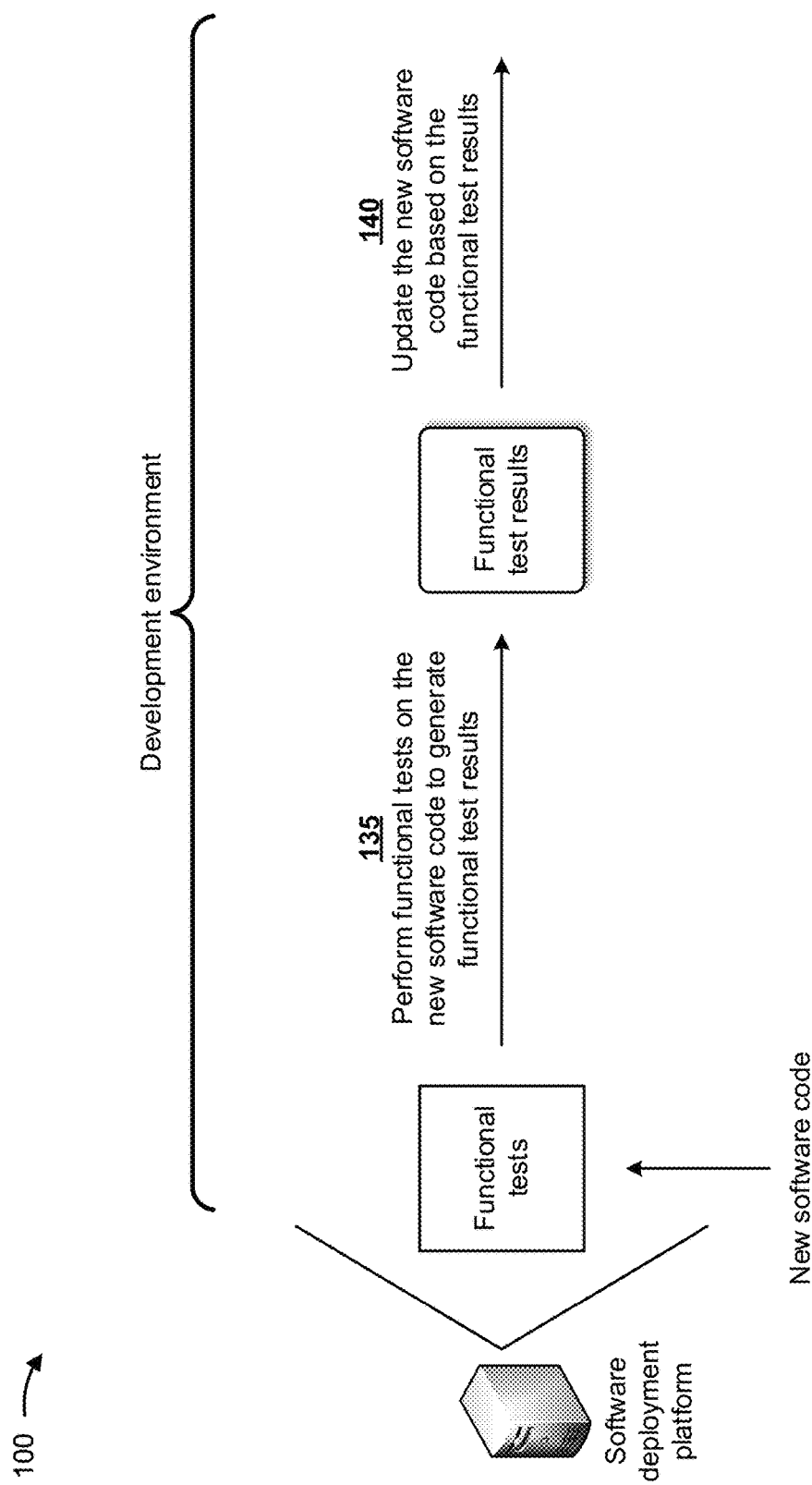

As shown in FIG. 1E, and by reference number 135, the software deployment platform may perform one or more functional tests on the new software code to generate functional test results. In some implementations, the software deployment platform may perform the one or more functional tests on the new software code via the development environment. In some implementations, the one or more functional tests may include a test to verify the new software code by checking the new software code against specifications of the new software code; a test that identifies functions that the new software code is expected to perform, creates input data based on the functions, determines output data based on the functions, and compares actual and expected outputs; a smoke test (e.g., a test to reveal failures severe enough to, for example, reject a prospective software release); a sanity test (e.g., execution of a functionality of a software program to ensure that a portion of the software program operates as expected); a usability test (e.g., to determine whether a software program meets an intended purpose); and/or the like.

In some implementations, the software deployment platform may select the one or more functional tests, from multiple functional tests, based on the new software code. For example, the software deployment platform may analyze the new software code to determine functions of the new software code, and may select a functional test that is applicable to the determined functions of the new software code. In some implementations, the software deployment platform may select the one or more functional tests based on a language of the new software code, based on the development environment, based on defect categories associated with the new software code, based on reports generated by the functional tests, and/or the like.

As further shown in FIG. 1E, and by reference number 140, the software deployment platform may update the new software code based on the functional test results. In some implementations, the software deployment platform may update the new software code based on the functional test results via the development environment. In some implementations, the software deployment platform may update the new software code based on the functional test results by making one or more changes to the new software code based on the functional test results, by adding one or more new features to the new software code based on the functional test results, by removing one or more features from the new software code based on the functional test results, and/or the like. In this way, the software deployment platform may provide defect-free software code, satisfy requirements of the new software code, ensure proper execution of the functionalities of the new software code, and/or the like.

Figure 1F:
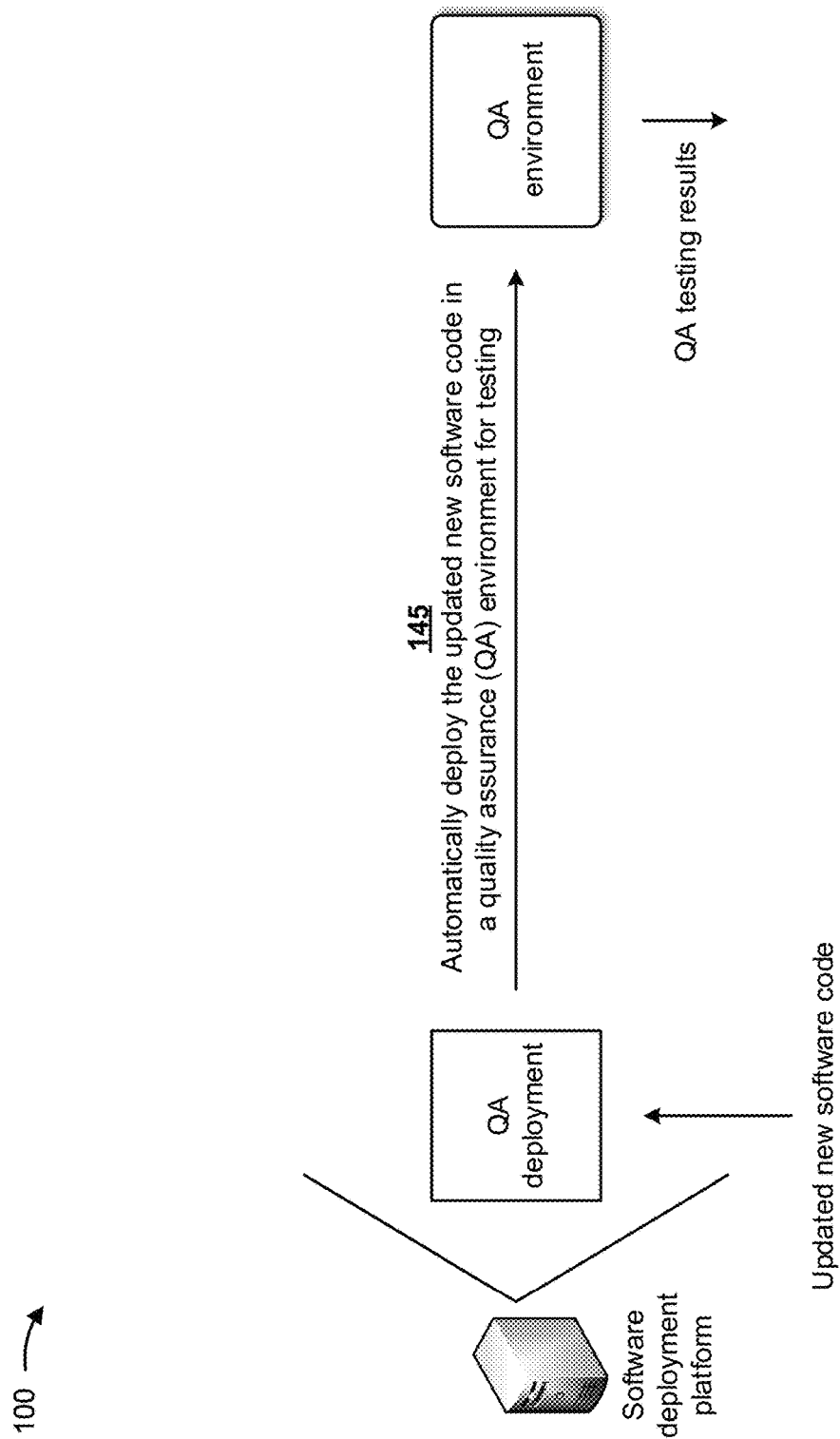

As shown in FIG. 1F, and by reference number 145, the software deployment platform may automatically deploy the updated new software code in a quality assurance (QA) environment for testing. In some implementations, the quality assurance environment may include a type of a software execution environment that is a single, functionally equivalent instance of a production environment in which the software code change is to be implemented. In some implementations, the quality assurance environment may include supporting infrastructure that the software deployment platform may utilize to complete quality assurance testing of the software code change. In some implementations, the software deployment platform may deploy the updated new software code in the quality assurance environment so that functional testers may execute any functional or performance testing of configurations, extensions, integrations, other changes, and/or the like of the updated new software code before the updated new software code is deployed in the production environment.

Figure 1G:
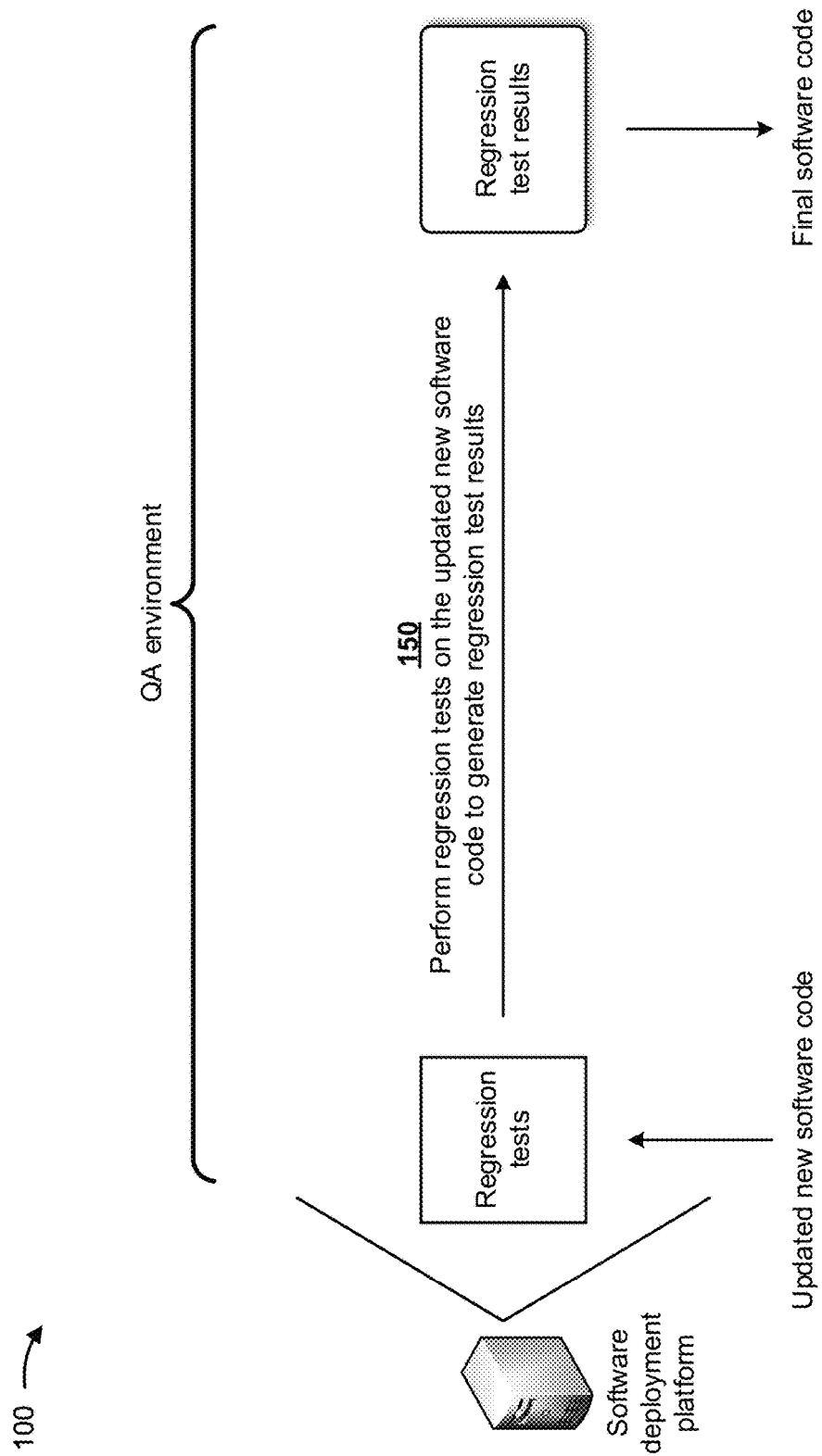

As shown in FIG. 1G, and by reference number 150, the software deployment platform may perform one or more regression tests on the updated new software code to generate regression test results. In some implementations, the software deployment platform may perform the one or more regression tests on the updated new software code via the quality assurance environment. In some implementations, the one or more regression tests may include a functional and/or a non-functional test to ensure that previously developed and tested software code (e.g., other than the updated new software code) still performs correctly after the software code change, a test to determine whether the new updated software code affects other software code associated with the updated new software code (e.g., if the updated new software code relates to a new sales report application, a regression test may determine whether the new sales report application affects an application that generates a balance sheet or an income statement), a workflow test, an application lifecycle management test, a test management tool test, and/or the like.

In some implementations, the software deployment platform may select the one or more regression tests, from multiple regression tests, based on the updated new software code. For example, the software deployment platform may analyze other software code that is affected by or cooperates with the updated new software code to determine functions and/or testable units of the other software code, and may select a regression test that is applicable to the determined functions and/or testable units of the other software code. In some implementations, the software deployment platform may select the one or more regression tests based on a language of the other software code, based on defect categories associated with the other software code, based on reports generated by the regression tests, based on quantities of inputs in the determined testable units of the other software code, based on behavior of the other software code, and/or the like.

Figure 1H:
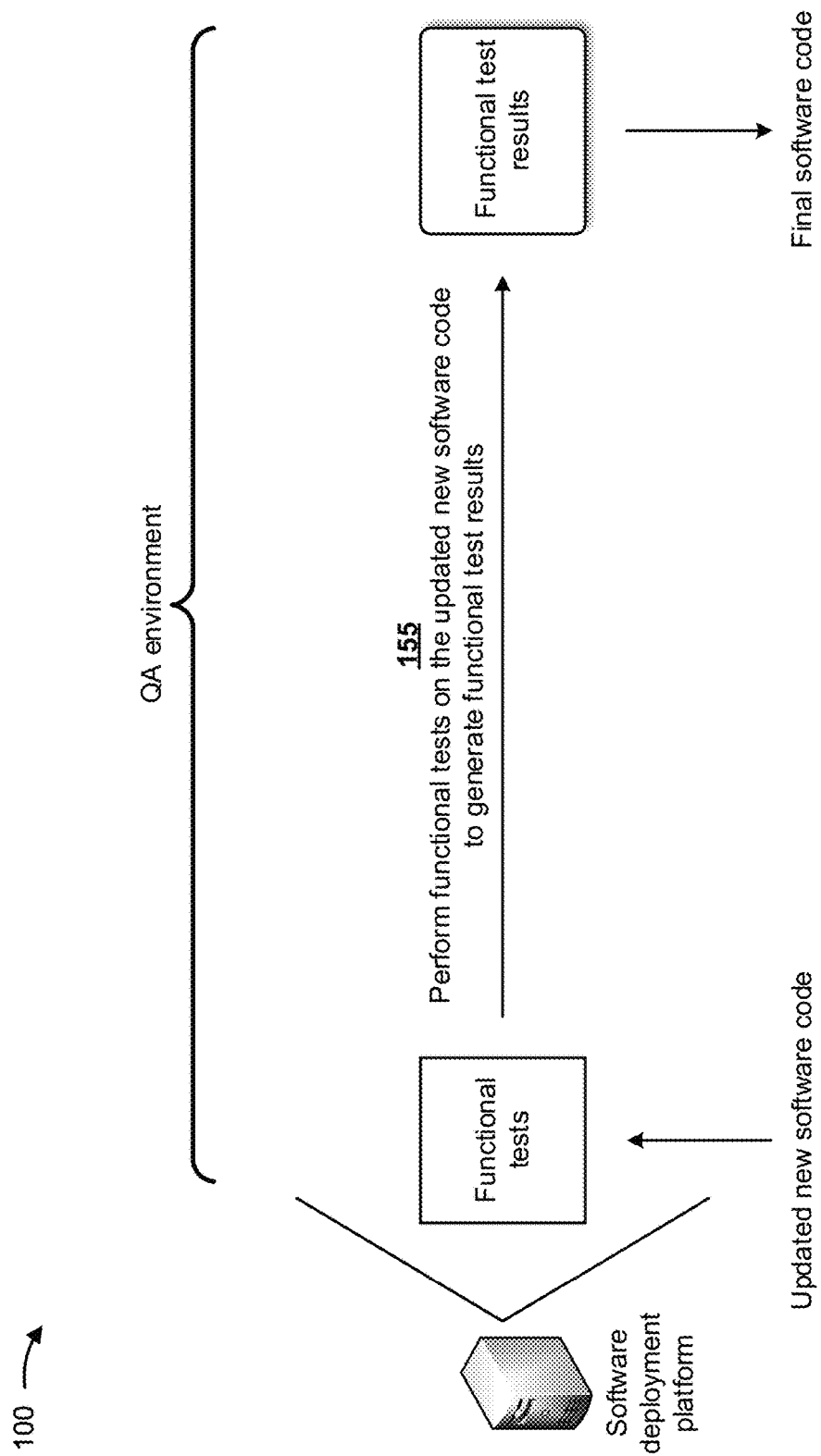

As shown in FIG. 1H, and by reference number 155, the software deployment platform may perform one or more functional tests on the updated new software code to generate functional test results. In some implementations, the software deployment platform may perform the one or more functional tests on the updated new software code via the quality assurance environment. In some implementations, the one or more functional tests may include a test to verify the updated new software code by checking the updated new software code against specifications of the updated new software code; a test that identifies functions that the updated new software code is expected to perform, creates input data based on the functions, determines output data based on the functions, and compares actual and expected outputs; a smoke test; a sanity test; a usability test; and/or the like.

In some implementations, the software deployment platform may select the one or more functional tests, from multiple functional tests, based on the updated new software code. For example, the software deployment platform may analyze the updated new software code to determine functions of the updated new software code, and may select a functional test that is applicable to the determined functions of the updated new software code. In some implementations, the software deployment platform may select the one or more functional tests based on a language of the updated new software code, based on the quality assurance environment, based on defect categories associated with the updated new software code, based on reports generated by the functional tests, and/or the like.

In some implementations, the software deployment platform may modify the updated new software code based on the regression test results and/or the functional test results. In some implementations, the software deployment platform may modify the updated new software code based on the regression test results and/or the functional test results, via the quality assurance environment. In some implementations, the software deployment platform may modify the updated new software code based on the regression test results and/or the functional test results by making one or more changes to the updated new software code, by adding one or more new features to the updated new software code, by removing one or more features from the updated new software code, and/or the like. In some implementations, modification of the updated new software code may generate final software code, as shown in FIGS. 1G and 1H.

Figure 1I:
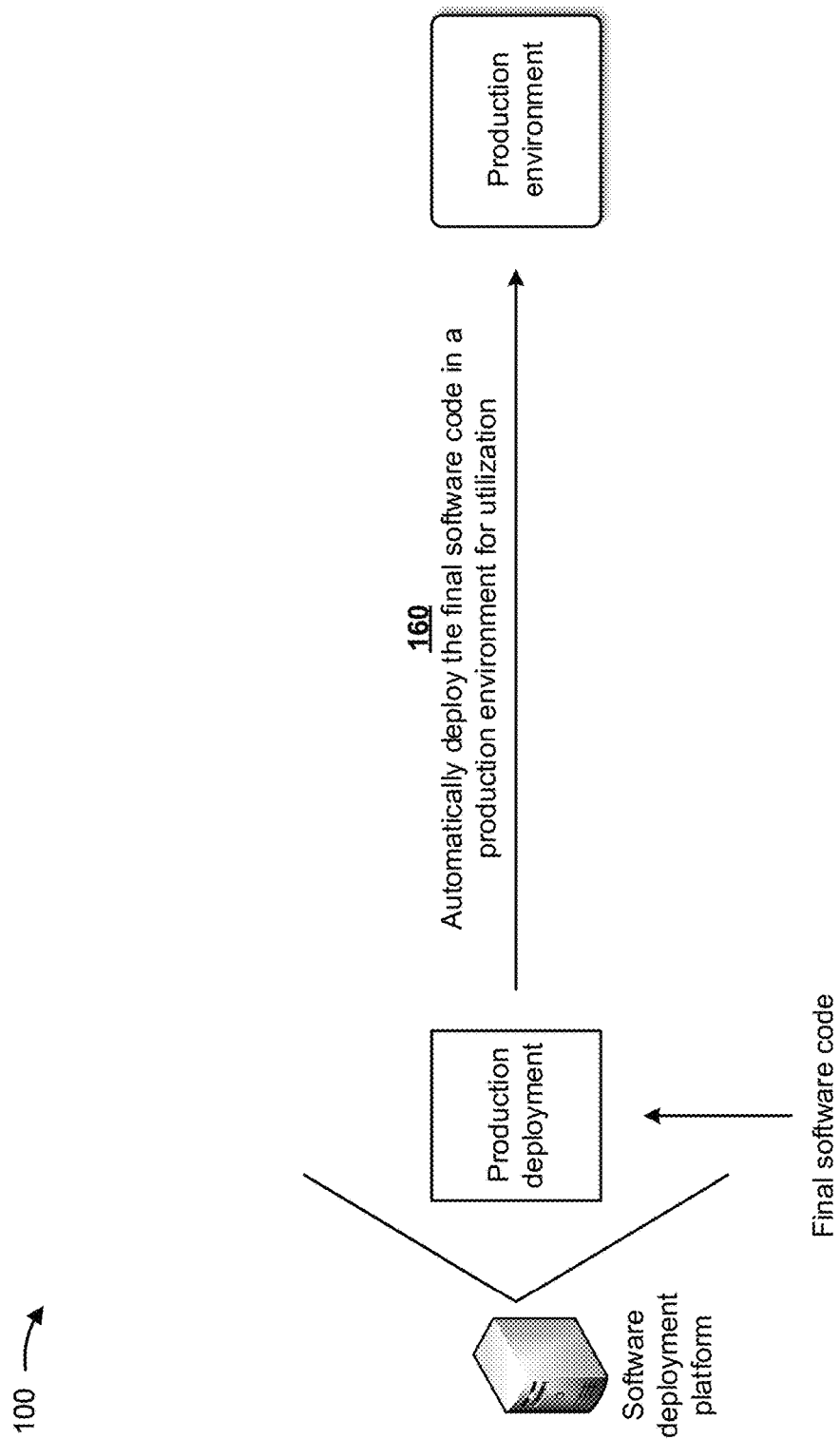

As shown in FIG. 1I, and by reference number 160, the software deployment platform may automatically deploy the final software code in a production environment for utilization. In some implementations, the production environment may include an environment where the final software code is deployed and executed, an environment where users may utilize the final software code, a network of distributed machines in data centers, a network of virtual machines in a cloud computing environment, and/or the like. In some implementations, the software deployment platform may automatically deploy the final software code once the final software code is generated by the software deployment platform. In some implementations, the software deployment platform may deploy the final software code when the final software code is approved for deployment.

Figure 1J:
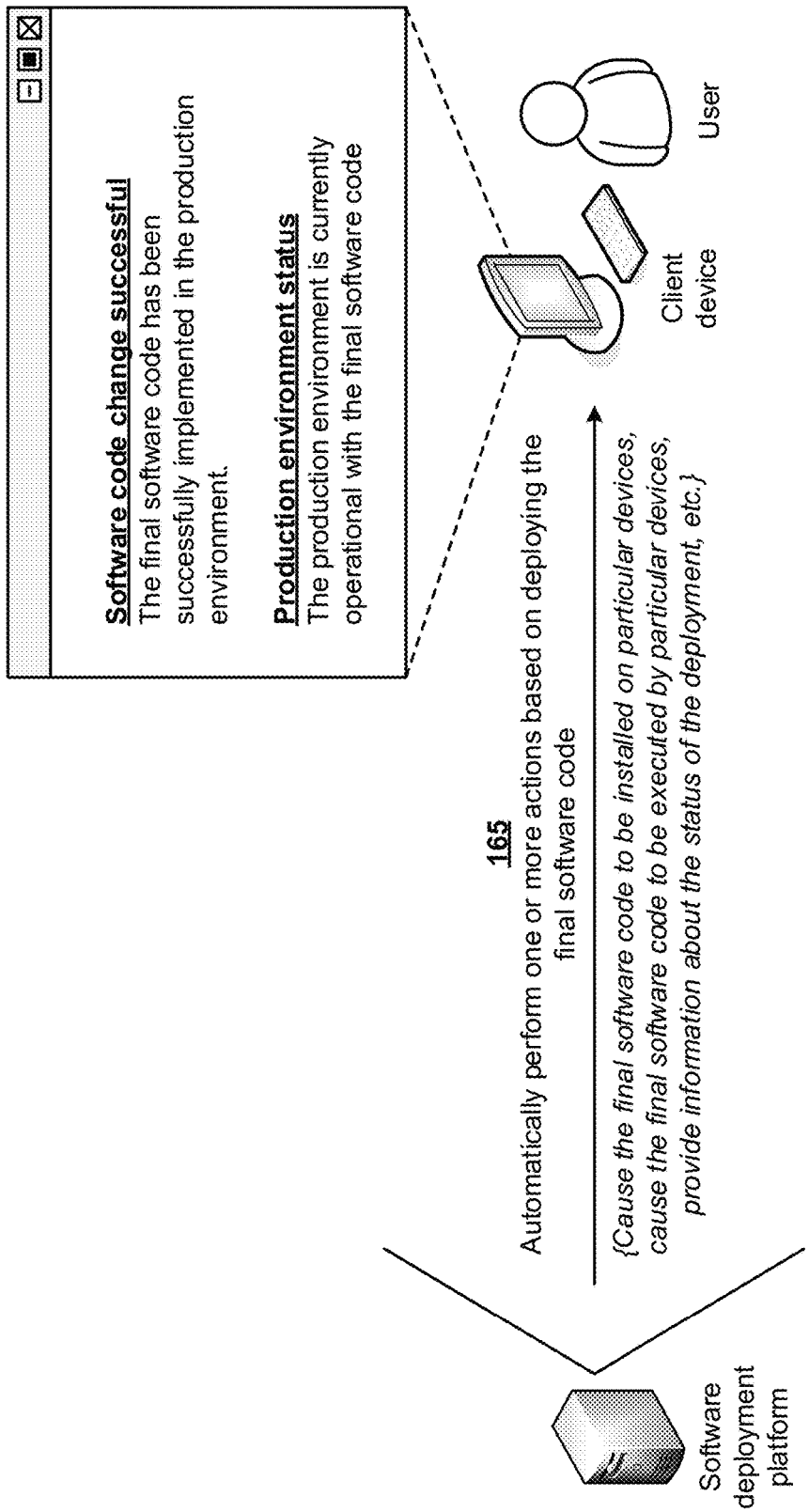

As further shown in FIG. 1J, and by reference number 165, the software deployment platform may automatically perform one or more actions based on deploying the final software code in the production environment. In some implementations, the one or more actions may include causing the final software code to be installed on particular devices. For example, the software deployment platform may automatically download and install the final software code on the particular devices. In this way, the software deployment platform may install the final software code on devices that will utilize the final software code.

In some implementations, the one or more actions may include causing the final software code to be executed by the particular devices. For example, the software deployment platform may automatically download the final software code to the particular devices and may cause the particular devices to execute the final software code. In this way, the software deployment platform may cause the software code change to be implemented by the particular devices.

In some implementations, the one or more actions may include causing the software code (e.g., without the software code change) to be erased from and/or replaced with the final software code on the particular devices. In this way, the software deployment platform may ensure software code (e.g., without the software code change) does not remain stored on the particular devices.

In some implementations, the one or more actions may include replacing a virtual machine based on the final software code. For example, if a virtual machine is providing software code that is outdated, the software deployment platform may replace the virtual machine with another virtual machine that provides the final software code. In this way, the software deployment platform may provide updated software code to customers.

In some implementations, the one or more actions may include reconfiguring one or more network devices of a network based on the final software code. For example, if a network device is configured to communicate with a virtual machine that provides outdated software code, the software deployment platform may reconfigure the network device to communicate with a virtual machine that provides the final software code. In this way, the software deployment platform may provide more efficient services for customers.

In some implementations, the one or more actions may include causing the final software code to be tested in the production environment to generate production results, updating the final software code based on the production results, and/or the like.

In some implementations, the one or more actions may include providing, to the client device, information about the status of the deployment of the final software code. In such implementations, the client device may present the information about the status of the deployment of the final software code to the user of the client device. For example, as shown in FIG. 1J, the client device may present information indicating that the software code change was successful (e.g., that the final software was successfully implemented in the production environment), a production environment status (e.g., that the production environment is currently operational with the final software code), and/or the like.

In some implementations, the software deployment platform may seamlessly move software code changes from development to production, which may conserve resources (e.g., processing resources, memory resources, and/or the like) and reduce delay in making the software changes available. In some implementations, the software deployment platform may intelligently automate end-to-end flow for deployment of software code changes.

In some implementations, the software deployment platform may provide a configuration maintainer that dynamically handles configurations. In such implementations, the software deployment platform may select a type of code review tool, test tool, deployment option, respective system, threshold value, dependency checks, and/or the like for each step of the software development and deployment process. In such implementations, the software deployment platform may provide flexibility in updating any new environments for software development and/or deployment.

In some implementations, the software deployment platform may include intelligent modules to track the process flow and control a next sequence of actions. In some implementations, the software deployment platform may identify whether software code changes are ready for peer review based on a status of a static code review. In some implementations, the software deployment platform may identify test scripts for development software code changes in the process, may trigger respective test execution, and may capture results of the test execution. In some implementations, the software deployment platform may identify dependent portions of a software code change before deployment of the software code change.

In some implementations, the software deployment platform may include a checklist model that checks if the software code change followed a required process before the software code change qualifies for deployment to a production environment. In some implementations, the software deployment platform may automatically link all software code changes and defects to an original software change request, and may provide real-time status information via a user interface. In some implementations, the software deployment platform may determine whether the software code change is associated with a particular development environment, and may utilize a determined development life cycle (e.g., utilize respective code review tools, review mechanisms, test execution, and/or the like). In some implementations, the software deployment platform may automatically update a status of an original software change request based on a result of individual process execution.

In some implementations, the software deployment platform may include a dynamic configuration handler that selects a type of code review tool, test tool, deployment option, respective system, threshold value, and/or the like, for each process step. In such implementations, the dynamic configuration handler may provide a table that dynamically maintains statuses selected by a user, and may provide programs that dynamically process a next sequence of actions based on data.

In some implementations, the software deployment platform may provide workflow for ensuring peer review. In such implementations, the software deployment platform may ensure that static review is executed after a task is released, and, upon successful static code review, may trigger a peer review workflow. The software deployment platform may decide whether static code review has passed threshold values, may provide details of static review and results of dependency checks, may capture reviewer comments, and/or the like.

In some implementations, the software deployment platform may provide automatic identification of test scripts for code portions that have passed code review. In such implementations, the software deployment platform may automatically link code portions to test scripts and when the code portions are reviewed, and may provide an automatic notification to a tester with details of test scripts to be executed. The software deployment platform may capture the code portions and applicability of the code portions to test phases for a particular test script. The software deployment platform may identify test scripts linked to code portions.

In some implementations, the software deployment platform may provide automatic identification of dependent code portions. In some implementations, the software deployment platform may provide a dynamic process check. In such implementations, the software deployment platform may ensure that a process is followed as per configurations. In such implementations, the software deployment platform may process, verify, and invoke correct services and/or other methods for execution. In such implementations, the software deployment platform may invoke correct services to post status updates or to call test execution.

In some implementations, the software deployment platform may provide automatic linking of software code change requests to subtasks. In such implementations, the software deployment platform may check details of a software code change request creation from tables.

In some implementations, the software deployment platform may provide automatic selection of workflow based on technology linked to a software code change request. In such implementations, the software deployment platform may ensure that a correct set of tools and workflow is adopted, and may invoke correct services to perform the jobs based on the technology. In such implementations, the software deployment platform may provide tables that maintain a sequence of steps for execution based on the technology.

In some implementations, the software deployment platform may provide automatic execution of test scripts that link to a test phase. In such implementations, the software deployment platform may invoke a test path, a test phase name, a test tool, and/or the like.

In some implementations, the software deployment platform may provide automatic defect creation. In such implementations, the software deployment platform may capture test execution results, may create defects for failed test scripts, and may search for a next sequence of steps for passing test scripts.

In some implementations, the software deployment platform may provide automatic deployment of a scheduled job to be released. In such implementations, the software deployment platform may verify that predefined steps (e.g., code review, peer review, dependency checks, testing, and/or the like) are successfully executed before deploying the software code change to a higher environment.

In some implementations, the software deployment platform may automatically create defects based on a test failure, such as failures that occur during functional testing, regression testing, and/or the like.

In this way, several different stages of the process for testing and deployment of software code changes are automated, which may remove human subjectivity and waste from the process, and which may improve speed and efficiency of the process and conserve computing resources (e.g., processing resources, memory resources, and/or the like). Furthermore, implementations described herein use a rigorous, computerized process to perform tasks or roles that were not previously performed or were previously performed using subjective human intuition or input. For example, currently there does not exist a technique that automatically tests and deploys software code changes. Finally, automating the process for testing and deployment of software code changes conserves computing resources (e.g., processing resources, memory resources, and/or the like) that would otherwise be wasted in attempting to test and deploy software code changes.

As indicated above, FIGS. 1A-1J are provided merely as examples. Other examples are possible and may differ from what was described with regard to FIGS. 1A-1J.

Figure 2:
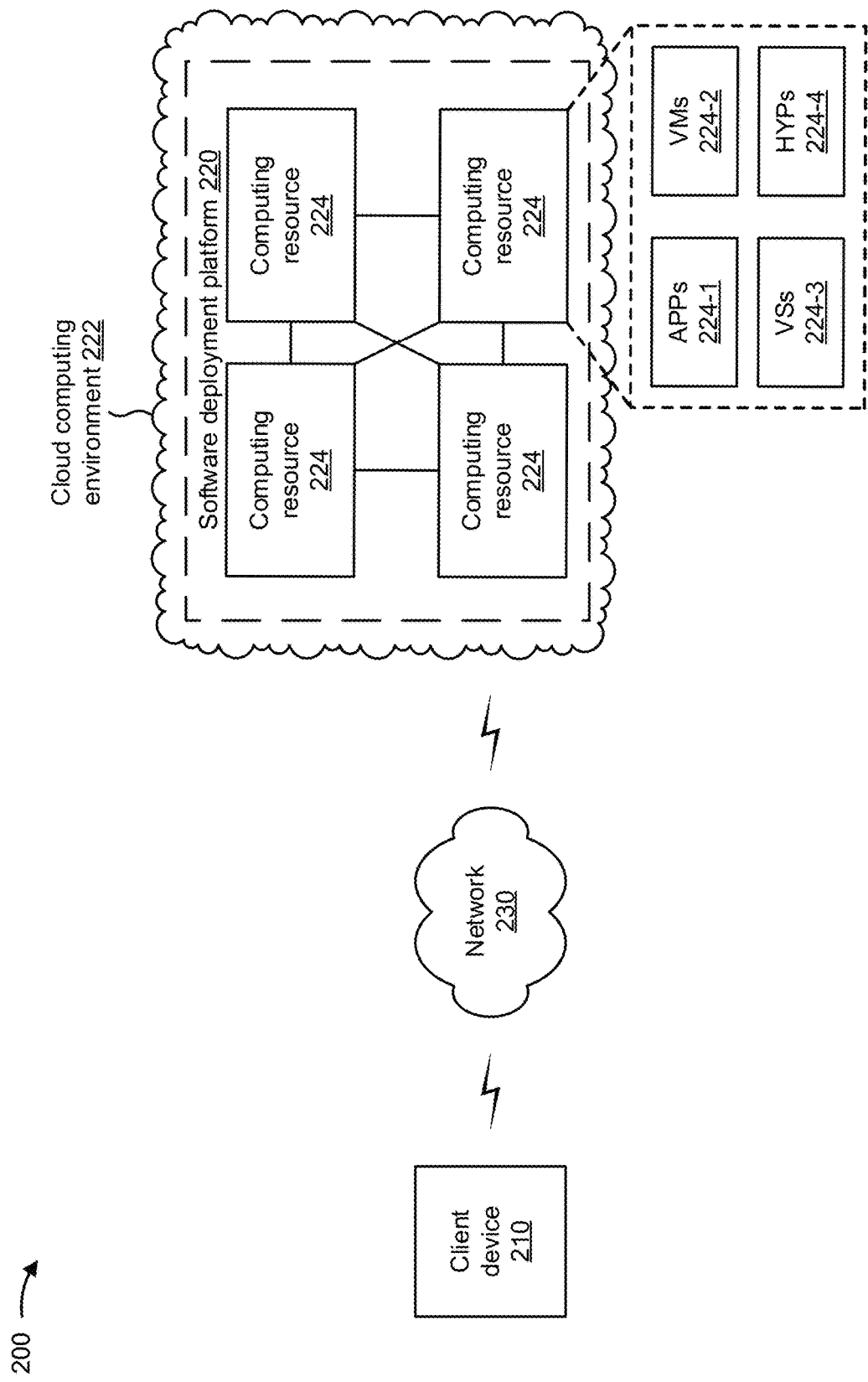
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a software deployment platform 220, and a network 230. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, etc.), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, etc.), or a similar type of device. In some implementations, client device 210 may receive information from and/or transmit information to software deployment platform 220.

Software deployment platform 220 includes one or more devices that automate testing and deployment of software code changes. In some implementations, software deployment platform 220 may be designed to be modular such that certain software components may be swapped in or out depending on a particular need. As such, software deployment platform 220 may be easily and/or quickly reconfigured for different uses. In some implementations, software deployment platform 220 may receive information from and/or transmit information to one or more client devices 210.

In some implementations, as shown, software deployment platform 220 may be hosted in a cloud computing environment 222. Notably, while implementations described herein describe software deployment platform 220 as being hosted in cloud computing environment 222, in some implementations, software deployment platform 220 may not be cloud-based (i.e., may be implemented outside of a cloud computing environment) or may be partially cloud-based.

Cloud computing environment 222 includes an environment that hosts software deployment platform 220. Cloud computing environment 222 may provide computation, software, data access, storage, etc. services that do not require end-user knowledge of a physical location and configuration of system(s) and/or device(s) that hosts software deployment platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host software deployment platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210. Application 224-1 may eliminate a need to install and execute the software applications on client device 210. For example, application 224-1 may include software associated with software deployment platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of client device 210 or an operator of software deployment platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
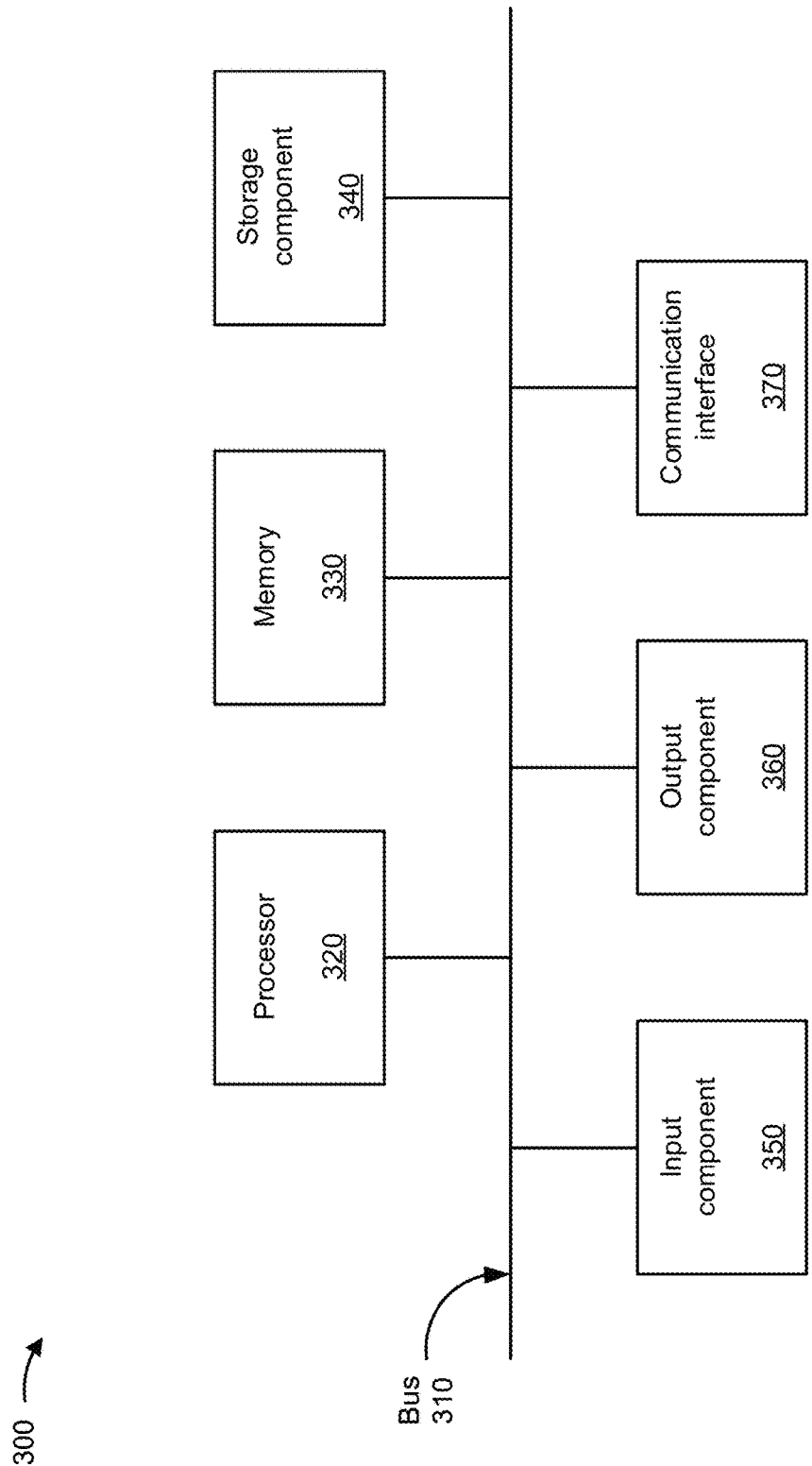
FIG. 3 is a diagram of example components of one or more devices of FIG. 2.

FIG. 3 is a diagram of example components of a device 300. Device 300 may correspond to client device 210, software deployment platform 220, and/or computing resource 224. In some implementations, client device 210, software deployment platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
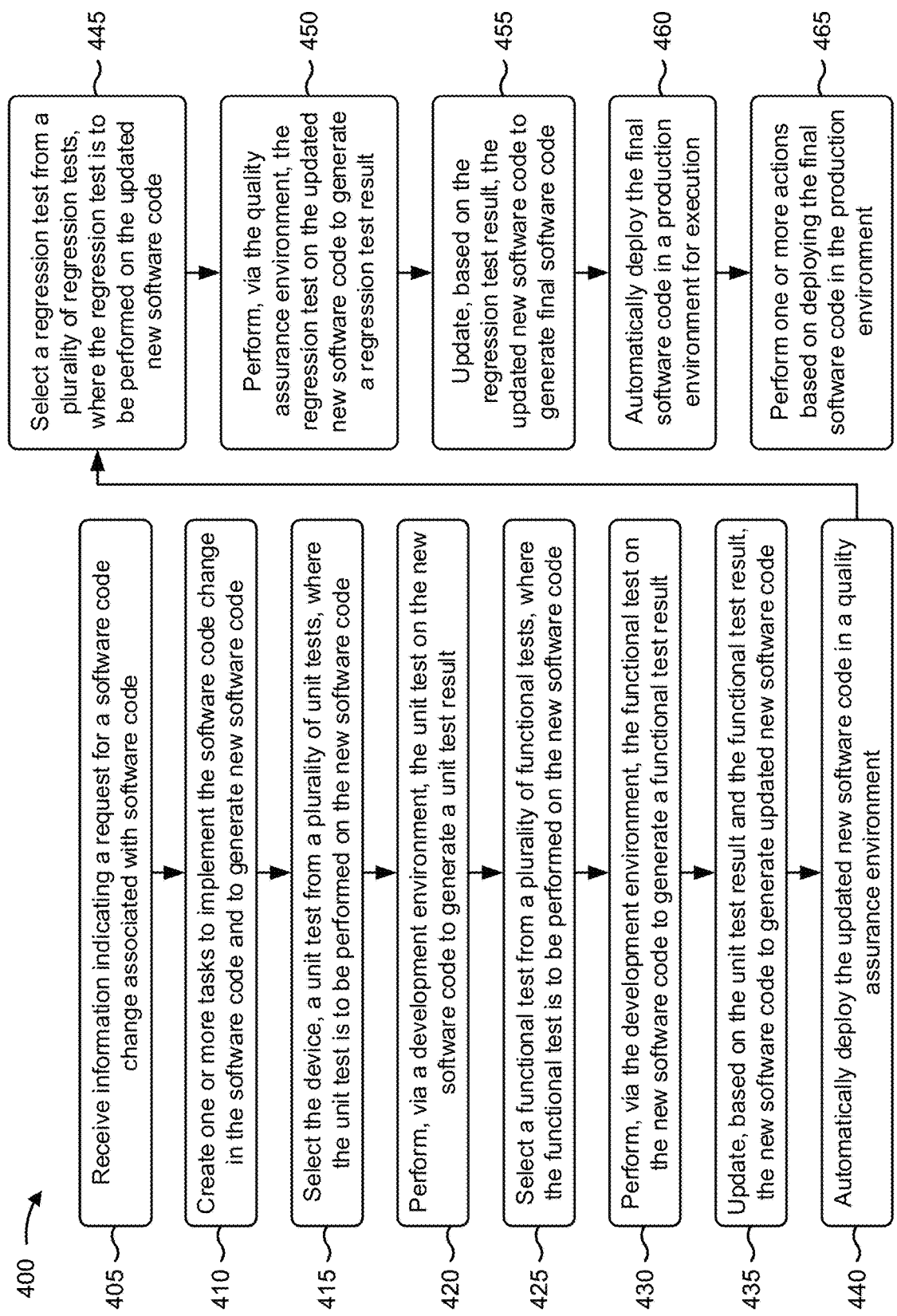

FIG. 4 is a flow chart of an example process 400 for automating testing and deployment of software code changes. In some implementations, one or more process blocks of FIG. 4 may be performed by a software deployment platform (e.g., software deployment platform 220). In some implementations, one or more process blocks of FIG. 4 may be performed by another device or a group of devices separate from or including the software deployment platform, such as a client device (e.g., client device 210).

As shown in FIG. 4, process 400 may include receiving information indicating a request for a software code change associated with software code (block 405). For example, the software deployment platform (e.g., using computing resource 224, processor 320, communication interface 370, and/or the like) may receive information indicating a request for a software code change associated with software code, as described above in connection with FIGS. 1A-2.

As further shown in FIG. 4, process 400 may include creating one or more tasks to implement the software code change in the software code and to generate new software code (block 410). For example, the software deployment platform (e.g., using computing resource 224, processor 320, memory 330, and/or the like) may create one or more tasks to implement the software code change in the software code and to generate new software code, as described above in connection with FIGS. 1A-2.

As further shown in FIG. 4, process 400 may include selecting a unit test from a plurality of unit tests, where the unit test is to be performed on the new software code (block 415). For example, the software deployment platform (e.g., using computing resource 224, processor 320, storage component 340, and/or the like) may select a unit test from a plurality of unit tests, as described above in connection with FIGS. 1A-2. In some implementations, the unit test may be performed on the new software code.

As further shown in FIG. 4, process 400 may include performing, via a development environment, the unit test on the new software code to generate a unit test result (block 420). For example, the software deployment platform (e.g., using computing resource 224, processor 320, memory 330, storage component 340, and/or the like) may perform, via a development environment, the unit test on the new software code to generate a unit test result, as described above in connection with FIGS. 1A-2.

As further shown in FIG. 4, process 400 may include selecting a functional test from a plurality of functional tests, where the functional test is to be performed on the new software code (block 425). For example, the software deployment platform (e.g., using computing resource 224, processor 320, memory 330, and/or the like) may select a functional test from a plurality of functional tests, as described above in connection with FIGS. 1A-2. In some implementations, the functional test may be performed on the new software code.

As further shown in FIG. 4, process 400 may include performing, via the development environment, the functional test on the new software code to generate a functional test result (block 430). For example, the software deployment platform (e.g., using computing resource 224, processor 320, storage component 340, and/or the like) may perform, via the development environment, the functional test on the new software code to generate a functional test result, as described above in connection with FIGS. 1A-2.

As further shown in FIG. 4, process 400 may include updating, based on the unit test result and the functional test result, the new software code to generate updated new software code (block 435). For example, the software deployment platform (e.g., using computing resource 224, processor 320, memory 330, and/or the like) may update, based on the unit test result and the functional test result, the new software code to generate updated new software code, as described above in connection with FIGS. 1A-2.

As further shown in FIG. 4, process 400 may include automatically deploying the updated new software code in a quality assurance environment (block 440). For example, the software deployment platform (e.g., using computing resource 224, processor 320, memory 330, communication interface 370, and/or the like) may automatically deploy the updated new software code in a quality assurance environment, as described above in connection with FIGS. 1A-2.

As further shown in FIG. 4, process 400 may include selecting a regression test from a plurality of regression tests, where the regression test is to be performed on the updated new software code (block 445). For example, the software deployment platform (e.g., using computing resource 224, processor 320, storage component 340, and/or the like) may select a regression test from a plurality of regression tests, as described above in connection with FIGS. 1A-2. In some implementations, the regression test may be performed on the updated new software code.

As further shown in FIG. 4, process 400 may include performing, via the quality assurance environment, the regression test on the updated new software code to generate a regression test result (block 450). For example, the software deployment platform (e.g., using computing resource 224, processor 320, memory 330, and/or the like) may perform, via the quality assurance environment, the regression test on the updated new software code to generate a regression test result, as described above in connection with FIGS. 1A-2.

As further shown in FIG. 4, process 400 may include updating, based on the regression test result, the updated new software code to generate final software code (block 455). For example, the software deployment platform (e.g., using computing resource 224, processor 320, storage component 340, and/or the like) may update, based on the regression test result, the updated new software code to generate final software code, as described above in connection with FIGS. 1A-2.

As further shown in FIG. 4, process 400 may include automatically deploying the final software code in a production environment for execution (block 460). For example, the software deployment platform (e.g., using computing resource 224, processor 320, communication interface 370, and/or the like) may automatically deploy the final software code in a production environment for execution, as described above in connection with FIGS. 1A-2.

As further shown in FIG. 4, process 400 may include performing one or more actions based on deploying the final software code in the production environment (block 465). For example, the software deployment platform (e.g., using computing resource 224, processor 320, memory 330, communication interface 370, and/or the like) may perform one or more actions based on deploying the final software code in the production environment, as described above in connection with FIGS. 1A-2.

Process 400 may include additional implementations, such as any single implementation or any combination of implementations described below and/or described with regard to any other process described herein.

In some implementations, the software deployment platform may perform, via the development environment, a code review of the new software code to generate a code review result, and the software deployment platform may, when updating the new software code to generate the updated new software code, update the new software code to generate the updated new software code based on the code review result.

In some implementations, the software deployment platform may perform, via the quality assurance environment, the functional test on the updated new software code to generate another functional test result, and the software deployment platform may, when updating the updated new software code to generate the final software code, update the updated new software code to generate the final software code based on the other functional test result.

In some implementations, when performing the one or more actions based on deploying the final software code in the production environment, the software deployment platform may cause the final software code to be installed on one or more particular devices, may cause the final software code to be executed by the one or more particular devices, may provide information associated with execution of the final software code in the production environment, may provide information associated with deployment of the final software code in the production environment, may cause the final software code to be tested in the production environment to generate production results, or may update the final software code based on the production results.

In some implementations, the software deployment platform may automatically approve the final software code before deploying the final software code in the production environment. In some implementations, the regression test may determine whether the updated new software code affects other software code in the production environment. In some implementations, the software deployment platform may automatically generate one or more notifications associated with one or more of the unit test result, the functional test result, or the regression test result.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for automating testing and deployment of software code changes. In some implementations, one or more process blocks of FIG. 5 may be performed by a software deployment platform (e.g., software deployment platform 220). In some implementations, one or more process blocks of FIG. 5 may be performed by another device or a group of devices separate from or including the software deployment platform, such as a client device (e.g., client device 210).

As shown in FIG. 5, process 500 may include receiving information indicating a request for a software code change associated with software code (block 505). For example, the software deployment platform (e.g., using computing resource 224, processor 320, communication interface 370, and/or the like) may receive information indicating a request for a software code change associated with software code, as described above in connection with FIGS. 1A-2.

As further shown in FIG. 5, process 500 may include creating one or more tasks to implement the software code change in the software code and to generate new software code (block 510). For example, the software deployment platform (e.g., using computing resource 224, processor 320, memory 330, and/or the like) may create one or more tasks to implement the software code change in the software code and to generate new software code, as described above in connection with FIGS. 1A-2.

As further shown in FIG. 5, process 500 may include automatically deploying the new software code in a development environment for testing (block 515). For example, the software deployment platform (e.g., using computing resource 224, processor 320, communication interface 370, and/or the like) may automatically deploy the new software code in a development environment for testing, as described above in connection with FIGS. 1A-2.

As further shown in FIG. 5, process 500 may include performing, via the development environment, a unit test on the new software code to generate a unit test result (block 520). For example, the software deployment platform (e.g., using computing resource 224, processor 320, memory 330, storage component 340, and/or the like) may perform, via the development environment, a unit test on the new software code to generate a unit test result, as described above in connection with FIGS. 1A-2.

As further shown in FIG. 5, process 500 may include performing, via the development environment, a functional test on the new software code to generate a functional test result (block 525). For example, the software deployment platform (e.g., using computing resource 224, processor 320, memory 330, and/or the like) may perform, via the development environment, a functional test on the new software code to generate a functional test result, as described above in connection with FIGS. 1A-2.

As further shown in FIG. 5, process 500 may include updating, based on the unit test result and the functional test result, the new software code to generate updated new software code (block 530). For example, the software deployment platform (e.g., using computing resource 224, processor 320, storage component 340, and/or the like) may update, based on the unit test result and the functional test result, the new software code to generate updated new software code, as described above in connection with FIGS. 1A-2.

As further shown in FIG. 5, process 500 may include automatically deploying the updated new software code in a quality assurance environment for further testing (block 535). For example, the software deployment platform (e.g., using computing resource 224, processor 320, memory 330, communication interface 370, and/or the like) may automatically deploy the updated new software code in a quality assurance environment for further testing, as described above in connection with FIGS. 1A-2.

As further shown in FIG. 5, process 500 may include performing, via the quality assurance environment, a regression test on the updated new software code to generate a regression test result (block 540). For example, the software deployment platform (e.g., using computing resource 224, processor 320, memory 330, and/or the like) may perform, via the quality assurance environment, a regression test on the updated new software code to generate a regression test result, as described above in connection with FIGS. 1A-2.

As further shown in FIG. 5, process 500 may include updating, based on the regression test result, the updated new software code to generate final software code (block 545). For example, the software deployment platform (e.g., using computing resource 224, processor 320, storage component 340, and/or the like) may update, based on the regression test result, the updated new software code to generate final software code, as described above in connection with FIGS. 1A-2.

As further shown in FIG. 5, process 500 may include automatically deploying the final software code in a production environment for execution (block 550). For example, the software deployment platform (e.g., using computing resource 224, processor 320, communication interface 370, and/or the like) may automatically deploy the final software code in a production environment for execution, as described above in connection with FIGS. 1A-2.

As further shown in FIG. 5, process 500 may include performing one or more actions based on deploying the final software code in the production environment (block 555). For example, the software deployment platform (e.g., using computing resource 224, processor 320, memory 330, communication interface 370, and/or the like) may perform one or more actions based on deploying the final software code in the production environment, as described above in connection with FIGS. 1A-2.

Process 500 may include additional implementations, such as any single implementation or any combination of implementations described below and/or described with regard to any other process described herein.

In some implementations, the software deployment platform may perform a code review of the new software code to generate a code review result, and the software deployment platform, when updating the new software code to generate the updated new software code, may update the new software code to generate the updated new software code based on the code review result. In some implementations, the unit test may include one or more of a workflow test, an application lifecycle management test, or a test management tool test.

In some implementations, when performing the one or more actions based on deploying the final software code in the production environment, the software deployment platform may cause the final software code to be installed on one or more particular devices, may cause the final software code to be executed by the one or more particular devices, may provide information associated with execution of the final software code in the production environment, may provide information associated with deployment of the final software code in the production environment, may cause the final software code to be tested in the production environment to generate production results, or may update the final software code based on the production results.

In some implementations, the final software code may include an enterprise resource planning application, a web application, or a mobile application. In some implementations, the regression test may determine whether the updated new software code affects other software code in the production environment.

In some implementations, the software deployment platform may automatically generate one or more notifications associated with automatically deploying the new software code in the development environment for testing, automatically deploying the updated new software code in the quality assurance environment for further testing, and/or automatically deploying the final software code in the production environment for execution.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for automating testing and deployment of software code changes. In some implementations, one or more process blocks of FIG. 6 may be performed by a software deployment platform (e.g., software deployment platform 220). In some implementations, one or more process blocks of FIG. 6 may be performed by another device or a group of devices separate from or including the software deployment platform, such as a client device (e.g., client device 210).

As shown in FIG. 6, process 600 may include creating one or more tasks to implement a software code change in software code and to generate new software code (block 605). For example, the software deployment platform (e.g., using computing resource 224, processor 320, memory 330, and/or the like) may create one or more tasks to implement a software code change in software code and to generate new software code, as described above in connection with FIGS. 1A-2.

As further shown in FIG. 6, process 600 may include automatically deploying the new software code in a development environment for testing (block 610). For example, the software deployment platform (e.g., using computing resource 224, processor 320, communication interface 370, and/or the like) may automatically deploy the new software code in a development environment for testing, as described above in connection with FIGS. 1A-2.

As further shown in FIG. 6, process 600 may include performing, via the development environment, unit tests on the new software code to generate unit test results (block 615). For example, the software deployment platform (e.g., using computing resource 224, processor 320, storage component 340, and/or the like) may perform, via the development environment, unit tests on the new software code to generate unit test results, as described above in connection with FIGS. 1A-2.

As further shown in FIG. 6, process 600 may include performing, via the development environment, functional tests on the new software code to generate functional test results (block 620). For example, the software deployment platform (e.g., using computing resource 224, processor 320, memory 330, and/or the like) may perform, via the development environment, functional tests on the new software code to generate functional test results, as described above in connection with FIGS. 1A-2.

As further shown in FIG. 6, process 600 may include updating, based on the unit test results and the functional test results, the new software code to generate updated new software code (block 625). For example, the software deployment platform (e.g., using computing resource 224, processor 320, memory 330, storage component 340, and/or the like) may update, based on the unit test results and the functional test results, the new software code to generate updated new software code, as described above in connection with FIGS. 1A-2.

As further shown in FIG. 6, process 600 may include automatically deploying the updated new software code in a quality assurance environment for further testing (block 630). For example, the software deployment platform (e.g., using computing resource 224, processor 320, communication interface 370, and/or the like) may automatically deploy the updated new software code in a quality assurance environment for further testing, as described above in connection with FIGS. 1A-2.

As further shown in FIG. 6, process 600 may include performing, via the quality assurance environment, regression tests on the updated new software code to generate regression test results (block 635). For example, the software deployment platform (e.g., using computing resource 224, processor 320, storage component 340, and/or the like) may perform, via the quality assurance environment, regression tests on the updated new software code to generate regression test results, as described above in connection with FIGS. 1A-2.

As further shown in FIG. 6, process 600 may include performing, via the quality assurance environment, the functional tests on the updated new software code to generate additional functional test results (block 640). For example, the software deployment platform (e.g., using computing resource 224, processor 320, memory 330, and/or the like) may perform, via the quality assurance environment, the functional tests on the updated new software code to generate additional functional test results, as described above in connection with FIGS. 1A-2.

As further shown in FIG. 6, process 600 may include updating, based on the regression test results and the additional functional test results, the updated new software code to generate final software code (block 645). For example, the software deployment platform (e.g., using computing resource 224, processor 320, storage component 340, and/or the like) may update, based on the regression test results and the additional functional test results, the updated new software code to generate final software code, as described above in connection with FIGS. 1A-2.

As further shown in FIG. 6, process 600 may include automatically deploying the final software code in a production environment for execution (block 650). For example, the software deployment platform (e.g., using computing resource 224, processor 320, communication interface 370, and/or the like) may automatically deploy the final software code in a production environment for execution, as described above in connection with FIGS. 1A-2.

As further shown in FIG. 6, process 600 may include performing one or more actions based on deploying the final software code in the production environment (block 655). For example, the software deployment platform (e.g., using computing resource 224, processor 320, memory 330, communication interface 370, and/or the like) may perform one or more actions based on deploying the final software code in the production environment, as described above in connection with FIGS. 1A-2.

Process 600 may include additional implementations, such as any single implementation or any combination of implementations described below and/or described with regard to any other process described herein.

In some implementations, the software deployment platform may perform, via the development environment, a code review of the new software code to generate code review results, and may update the new software code to generate the updated new software code based on the code review results.

In some implementations, when performing the one or more actions, the software deployment platform may cause the final software code to be installed on one or more particular devices, may cause the final software code to be executed by the one or more particular devices, may provide information associated with execution of the final software code in the production environment, may provide information associated with deployment of the final software code in the production environment, may cause the final software code to be tested in the production environment to generate production results, and/or may update the final software code based on the production results.

In some implementations, the final software code may include one or more of an enterprise resource planning application, a web application, or a mobile application. In some implementations, the regression tests may determine whether the updated new software code affects other software code in the production environment. In some implementations, the software deployment platform may automatically generate one or more notifications associated with one or more of the unit test results, the functional test results, the additional functional test results, or the regression test results.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, information indicating a request for a software code change associated with software code;
   creating, by the device, one or more tasks to implement the software code change in the software code and to generate new software code,
      the software code including:
         the new software code, and
         other software code that was previously developed;
   selecting, by the device, a unit test from a plurality of unit tests,
      the unit test to be performed on the new software code;
   performing, by the device and via a development environment, the unit test on the new software code to generate a unit test result;
   selecting, by the device, a functional test from a plurality of functional tests,
      the functional test to be performed on the new software code;
   performing, by the device and via the development environment, the functional test on the new software code to generate a functional test result;
   updating, by the device and based on the unit test result and the functional test result, the new software code to generate updated new software code;
   automatically deploying, by the device, the updated new software code in a quality assurance environment;
   selecting, by the device, a regression test from a plurality of regression tests,
      the plurality of regression tests including one or more of:
         another functional test to ensure that the other software code still performs correctly after the software code change,
         a non-functional test to ensure that the other software code still performs correctly after the software code change, or
         a test to determine whether the new updated software code affects other applications associated with the updated new software code,
      wherein selecting the regression test comprises:
         analyzing the other software code that is affected by the updated new software code to determine a testable unit of the other software code, and selecting the regression test based on a quantity of inputs from the testable unit of the other software code, and the regression test to be performed on the updated new software code;

performing, by the device and via the quality assurance environment, the regression test on the updated new software code to generate a regression test result;

updating, by the device and based on the regression test result, the updated new software code to generate final software code;

automatically deploying, by the device, the final software code in a production environment for execution; and performing, by the device, one or more actions based on deploying the final software code in the production environment.

2. The method of claim 1, further comprising:

performing, via the development environment, a code review of the new software code to generate a code review result, and wherein updating the new software code to generate the updated new software code includes:
    updating the new software code to generate the updated new software code based on the code review result.

3. The method of claim 1, further comprising:

performing, via the quality assurance environment, the functional test on the updated new software code to generate another functional test result, and wherein updating the updated new software code to generate the final software code includes:
    updating the updated new software code to generate the final software code based on the other functional test result.

4. The method of claim 1, wherein performing the one or more actions based on deploying the final software code in the production environment comprises one or more of:

causing the final software code to be installed on one or more particular devices;

causing the final software code to be executed by the one or more particular devices;

providing information associated with execution of the final software code in the production environment;

providing information associated with deployment of the final software code in the production environment;

causing the final software code to be tested in the production environment to generate production results; or updating the final software code based on the production results.

5. The method of claim 1, further comprising:

automatically approving the final software code before deploying the final software code in the production environment.

6. The method of claim 1, further comprising:

automatically generating one or more notifications associated with one or more of:
    the unit test result,
    the functional test result, or
    the regression test result.

7. The method of claim 1, further comprising:

reconfiguring one or more network devices of a network based on the final software code.

8. A device, comprising:

one or more memories; and one or more processors, communicatively coupled to the one or more memories, to:
    receive information indicating a request for a software code change associated with software code;
    create one or more tasks to implement the software code change in the software code and to generate new software code,
        the software code including the new software code and other software code that was previously developed;
    automatically deploy the new software code in a development environment for testing;
    perform, via the development environment, a unit test on the new software code to generate a unit test result;
    perform, via the development environment, a functional test on the new software code to generate a functional test result;
    update, based on the unit test result and the functional test result, the new software code to generate updated new software code;
    automatically deploy the updated new software code in a quality assurance environment for further testing;
    select a regression test from a plurality of regression tests,
        the plurality of regression tests including one or more of:
            another functional test to ensure that the other software code still performs correctly after the software code change,
            a non-functional test to ensure that the other software code still performs correctly after the software code change, or
            a test to determine whether the new updated software code affects other applications associated with the updated new software code,
        wherein the one or more processors, when selecting the regression test, are to:
            analyze the other software code that is affected by the updated new software code to determine a function or testable unit of the other software code, and
            select the regression test based on a quantity of inputs from the testable unit of the other software code;
    perform, via the quality assurance environment, the regression test on the updated new software code to generate a regression test result;
    update, based on the regression test result, the updated new software code to generate final software code;
    automatically deploy the final software code in a production environment for execution; and
    perform one or more actions based on deploying the final software code in the production environment.

9. The device of claim 8, wherein the one or more processors are further to:

perform a code review of the new software code to generate a code review result, and wherein the one or more processors, when updating the new software code to generate the updated new software code, are to:
    update the new software code to generate the updated new software code based on the code review result.

10. The device of claim 8, wherein the unit test includes one or more of:

a workflow test,
an application lifecycle management test, or
a test management tool test.

11. The device of claim 8, wherein the one or more processors, when performing the one or more actions based on deploying the final software code in the production environment, are to one or more of:
  cause the final software code to be installed on one or more particular devices;
  cause the final software code to be executed by the one or more particular devices;
  provide information associated with execution of the final software code in the production environment;
  provide information associated with deployment of the final software code in the production environment;
  cause the final software code to be tested in the production environment to generate production results; or
  update the final software code based on the production results.

12. The device of claim 8, wherein the final software code includes one or more of:
  an enterprise resource planning application,
  a web application, or
  a mobile application.

13. The device of claim 8, wherein the one or more processors are further to:
  automatically generate one or more notifications associated with one or more of:
    automatically deploying the new software code in the development environment for testing,
    automatically deploying the updated new software code in the quality assurance environment for further testing, or
    automatically deploying the final software code in the production environment for execution.

14. The device of claim 8, wherein the one or more processors are further to:
  reconfigure one or more network devices of a network based on the final software code.

15. A non-transitory computer-readable medium storing instructions, the instructions comprising:
  one or more instructions that, when executed by one or more processors of a device, cause the one or more processors to:
    create one or more tasks to implement a software code change in software code and to generate new software code,
      the software code including the new software code and other software code that was previously developed;
    automatically deploy the new software code in a development environment for testing;
    perform, via the development environment, unit tests on the new software code to generate unit test results based on a quantity of inputs in testable units of the new software code;
    perform, via the development environment, functional tests on the new software code to generate functional test results;
    update, based on the unit test results and the functional test results, the new software code to generate updated new software code;
    automatically deploy the updated new software code in a quality assurance environment for further testing;
    analyze the other software code that is affected by the updated new software code to determine a function or testable unit of the other software code,
    select regression tests, from a plurality of regression tests, based on a quantity of inputs from the testable unit of the other software code,
      the plurality of regression tests including one or more of:
        another functional test to ensure that the other software code still performs correctly after the software code change,
        a non-functional test to ensure that the other software code still performs correctly after the software code change, or
        a test to determine whether the new updated software code affects other applications associated with the updated new software code;
    perform, via the quality assurance environment, the regression tests on the updated new software code to generate regression test results;
    perform, via the quality assurance environment, the functional tests on the updated new software code to generate additional functional test results;
    update, based on the regression test results and the additional functional test results, the updated new software code to generate final software code;
    automatically deploy the final software code in a production environment for execution; and
    perform one or more actions based on deploying the final software code in the production environment.

16. The non-transitory computer-readable medium of claim 15, wherein the instructions further comprise:
  one or more instructions that, when executed by the one or more processors, cause the one or more processors to:
    perform, via the development environment, a code review of the new software code to generate code review results; and
    update the new software code to generate the updated new software code based on the code review results.

17. The non-transitory computer-readable medium of claim 15, wherein the one or more instructions, that cause the one or more processors to perform the one or more actions, cause the one or more processors to one or more of:
  cause the final software code to be installed on one or more particular devices;
  cause the final software code to be executed by the one or more particular devices;
  provide information associated with execution of the final software code in the production environment;
  provide information associated with deployment of the final software code in the production environment;
  cause the final software code to be tested in the production environment to generate production results; or
  update the final software code based on the production results.

18. The non-transitory computer-readable medium of claim 15, wherein the final software code includes one or more of:
  an enterprise resource planning application,
  a web application, or
  a mobile application.

19. The non-transitory computer-readable medium of claim 15, wherein the instructions further comprise:
  one or more instructions that, when executed by the one or more processors, cause the one or more processors to:
    automatically generate one or more notifications associated with one or more of:
      the unit test results,
      the functional test results,
      the additional functional test results, or
      the regression test results.

20. The non-transitory computer-readable medium of claim 15, wherein the one or more instructions, when executed by the one or more processors, further cause the one or more processors to:
   reconfigure one or more network devices of a network based on the final software code.

* * * * *